(12) United States Patent
Nakaguchi et al.

(10) Patent No.: US 11,697,063 B2
(45) Date of Patent: Jul. 11, 2023

(54) STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

(71) Applicants: Nintendo Co., Ltd., Kyoto (JP); The Pokémon Company, Tokyo (JP)

(72) Inventors: Kenichi Nakaguchi, Tokyo (JP); Kazumasa Kitada, Tokyo (JP)

(73) Assignees: NINTENDO CO., LTD., Kyoto (JP); THE POKÉMON COMPANY, Tokyo (JP)

( * ) Notice: Subject to any disclaimer, the term of this patent is extended or adjusted under 35 U.S.C. 154(b) by 149 days.

(21) Appl. No.: 17/327,773

(22) Filed: May 24, 2021

(65) Prior Publication Data

US 2021/0387084 A1 Dec. 16, 2021

(30) Foreign Application Priority Data

Jun. 15, 2020 (JP) .................................. 2020-103108

(51) Int. Cl.
*A63F 13/211* (2014.01)
*A63F 13/213* (2014.01)
*G06F 3/042* (2006.01)
*G06F 3/0346* (2013.01)

(52) U.S. Cl.
CPC .......... *A63F 13/213* (2014.09); *A63F 13/211* (2014.09); *G06F 3/0346* (2013.01); *G06F 3/0425* (2013.01)

(58) Field of Classification Search
CPC .... A63F 13/211; A63F 13/213; G06F 3/0346; G06F 3/0425
See application file for complete search history.

(56) References Cited

U.S. PATENT DOCUMENTS 8,308,563 B2 * 11/2012 Ikeda ..................... A63F 13/42
463/36
9,914,056 B2 * 3/2018 Amano ................ A63F 13/525
2013/0065682 A1 * 3/2013 Izuno ................. A63F 13/5252
463/31

(Continued)

OTHER PUBLICATIONS

"Star Fox Zero", Nintendo of America Inc., Available Online at: https://www.nintendo.com/consumer/downloads/manual-WiiU-Star_Fox_Zero.pdf, [searched on Jun. 1, 2020], 41 pages.

*Primary Examiner* — David L Lewis
*Assistant Examiner* — Shauna-Kay N. Hall
(74) *Attorney, Agent, or Firm* — Nixon & Vanderhye PC

(57) ABSTRACT

In a case where a second camera operation through a third input unit using an inertial sensor is performed while a pointer operation process based on a pointer operation through a first input unit or a camera operation process based on a first camera operation through a second input unit is performed, an absolute value of a quantity of change in a position or an image capturing direction of a virtual camera based on the second camera operation is reduced as compared with a case where the second camera operation is performed when neither of the pointer operation process based on the pointer operation and the camera operation process based on the first camera operation are performed.

20 Claims, 15 Drawing Sheets

(56) References Cited

U.S. PATENT DOCUMENTS

| | | | | |
|---|---|---|---|---|
| 2013/0265217 | A1* | 10/2013 | Sakaguchi | G06F 3/0383 |
| | | | | 345/156 |
| 2013/0267310 | A1* | 10/2013 | Sakaguchi | A63F 13/428 |
| | | | | 463/31 |
| 2018/0036642 | A1* | 2/2018 | Tanaka | A63F 13/92 |
| 2018/0199022 | A1* | 7/2018 | Ueda | G06T 7/73 |
| 2018/0326302 | A1* | 11/2018 | Tsutsui | A63F 13/837 |
| 2018/0367787 | A1* | 12/2018 | Nakajima | H04N 7/147 |
| 2019/0366211 | A1* | 12/2019 | Suzuki | A63F 13/25 |

* cited by examiner

STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

CROSS-REFERENCE TO RELATED APPLICATION

This application claims priority to Japanese Patent Application No. 2020-103108 filed on Jun. 15, 2020, the entire contents of which are incorporated herein by reference.

FIELD

The technology shown here relates to a storage medium having stored therein an information processing program, an information processing apparatus, an information processing system, and an information processing method that perform the process of changing a display range with respect to a virtual space.

BACKGROUND AND SUMMARY

Conventionally, there is a game program where the display position of a target is moved or the image capturing direction of a virtual camera is changed using a plurality of input units.

In the game program, however, there is room for improvement in the manner of use of the input units for changing the position or the image capturing direction of the virtual camera.

Therefore, it is an object of an exemplary embodiment to provide a storage medium having stored therein an information processing program, an information processing apparatus, an information processing system, and an information processing method that are capable of improving the operability of an input unit for changing the position or the image capturing direction of a virtual camera.

To achieve the above object, the exemplary embodiment can employ, for example, the following configurations.

In an exemplary configuration of a non-transitory computer-readable storage medium having stored therein an information processing program according to the exemplary embodiment, a non-transitory computer-readable storage medium has stored therein instructions that, when executed by a processor of an information processing apparatus, cause the information processing apparatus to perform operations including: capturing a virtual space using a virtual camera to generate a display image to be displayed on a screen; based on a pointer operation through a first input unit, performing a pointer operation process for changing a position of a pointer displayed on the screen; based on a first camera operation through a second input unit, performing a camera operation process for changing a position or an image capturing direction of the virtual camera; based on a second camera operation through a third input unit using an inertial sensor, performing a camera operation process for changing the position or the image capturing direction of the virtual camera; and in a case where the second camera operation is performed while the pointer operation process based on the pointer operation or the camera operation process based on the first camera operation is performed, reducing an absolute value of a quantity of change in the position or the image capturing direction of the virtual camera based on the second camera operation as compared with a case where the second camera operation is performed when neither of the pointer operation process based on the pointer operation and the camera operation process based on the first camera operation are performed.

Based on the above, in a case where there are a plurality of input units for changing the position or the image capturing direction of a virtual camera, based on whether or not a process based on an operation using one of the input units is performed, the quantity of change in the position or the image capturing direction of the virtual camera is adjusted based on an operation using another one of the input units. Thus, it is possible to improve the operability of an input unit.

Further, the instructions may further cause the information processing apparatus to perform operations including: setting in the screen a movable range indicating a range where the pointer can move; and in a case where the pointer is located in an edge portion of the movable range, and if an edge portion operation as an operation of indicating a direction from the edge portion of the movable range to outside the movable range through the first input unit is performed, changing the position or the image capturing direction of the virtual camera in accordance with the direction of the edge portion operation.

Based on the above, it is possible to change the position or the image capturing direction of the virtual camera using three different input units.

Further, in a case where the second camera operation is performed while an edge portion operation process based on the edge portion operation or the camera operation process based on the first camera operation is performed, the absolute value of the quantity of change in the position or the image capturing direction of the virtual camera based on the second camera operation may be reduced as compared with a case where the second camera operation is performed when neither of the edge portion operation process based on the edge portion operation and the camera operation process based on the first camera operation are performed.

Based on the above, even if it is possible to change the position or the image capturing direction of the virtual camera using the three different input units, it is possible to improve the operability of these input units.

Further, if the edge portion operation is performed, the pointer located in the edge portion of the movable range and displayed on the screen may not be moved.

Based on the above, it is possible to improve the operability of a pointer operation.

Further, if the edge portion operation is performed by a first quantity of operation without performing the first camera operation, the position or the image capturing direction of the virtual camera may be changed by the first quantity of change in a first axis component, if the first camera operation is performed by a second quantity of operation without performing the edge portion operation, the position or the image capturing direction of the virtual camera may be changed by the second quantity of change in the first axis component, and in a case where the edge portion operation by the first quantity of operation and the first camera operation by the second quantity of operation are simultaneously performed, and if the first axis component of the first quantity of change and the first axis component of the second quantity of change are both positive, the quantity of change in the position or the image capturing direction of the virtual camera may be set to a third quantity of change greater than both the first quantity of change and the second quantity of change in the first axis component, and if the first axis component of the first quantity of change and the first axis component of the second quantity of change are both negative, the quantity of change in the position or the image capturing direction of the virtual camera may be set to a third quantity of change smaller than both the first quantity of change and the second quantity of change in the first axis component.

Based on the above, by simultaneously performing an edge portion operation and a first camera operation, it is possible to quickly change the position or the image capturing direction of the virtual camera.

Further, the third quantity of change may be determined by adding the first quantity of change and the second quantity of change.

Based on the above, by simultaneously performing the edge portion operation and the first camera operation, it is possible to quickly change the position or the image capturing direction of the virtual camera.

Further, the quantity of change in the position or the image capturing direction of the virtual camera based on the first camera operation may be the same in a case where the first camera operation is performed while the pointer operation process based on the pointer operation is performed and in a case where the first camera operation is performed while the pointer operation process based on the pointer operation is not performed.

Based on the above, a change in the position or the image capturing direction of the virtual camera based on a first camera operation is made by the same quantity of change regardless of whether or not a pointer operation process is performed. Thus, it is possible to change the position or the image capturing direction of the virtual camera by the first camera operation without changing the quantity of change at a timing desired by a user. Further, it is possible to perform the process of changing the position or the image capturing direction of the virtual camera based on the first camera operation while performing a pointer operation process based on a pointer operation.

Further, the quantity of change in the position or the image capturing direction of the virtual camera based on the first camera operation may be the same in a case where the first camera operation is performed while an edge portion operation process based on the edge portion operation is performed and in a case where the first camera operation is performed while the edge portion operation process based on the edge portion operation is not performed.

Based on the above, a change in the position or the image capturing direction of the virtual camera based on a first camera operation is made by the same quantity of change regardless of whether or not an edge portion operation process is performed. Thus, it is possible to change the position or the image capturing direction of the virtual camera by the first camera operation without changing the quantity of change at a timing desired by a user.

Further, in a case where the second camera operation is performed while the pointer operation process based on the pointer operation or the camera operation process based on the first camera operation is performed, the position or the image capturing direction of the virtual camera based on the second camera operation may not be changed.

Based on the above, in a case where a second camera operation is performed while a camera operation process based on a first camera operation is performed, a change in the position or the image capturing direction of the virtual camera based on the second camera operation is disabled. Thus, it is possible to prevent control of the virtual camera based on the first camera operation from being disturbed by an unintended motion of a third input unit.

Further, using an orientation change operation for changing an orientation from a reference orientation through the third input unit as the second camera operation, based on an amount of change in the orientation calculated based on an output of the inertial sensor, the quantity of change in the position or the image capturing direction of the virtual camera may be determined, and while the pointer operation process based on the pointer operation or the camera operation process based on the first camera operation is performed, the determination of the quantity of change based on the change in the orientation is skipped, and an orientation of the third input unit at a time when the pointer operation or the first camera operation ends may be newly set as the reference orientation.

Based on the above, a reference orientation of a third input device is reset at an appropriate timing. Thus, it is possible to improve the operability of using a second input device.

Further, the instructions may further cause the information processing apparatus to perform operations including performing game processing based on a position or a direction in the virtual space determined based on the position of the pointer displayed on the screen.

Based on the above, it is possible to improve operability in game play using a pointer.

Further, as the game processing, a virtual object may be fired at the position or in the direction in the virtual space determined based on the position of the pointer.

Based on the above, it is possible to improve operability when a game is played where a virtual object is fired at a pointer as a target.

Further, each of the first input unit and the second input unit may be a device that provides an output based on an operation using a finger of a user.

Based on the above, it is possible to improve operability in a case where a user performs an operation using their finger.

The exemplary embodiment may be carried out in the forms of an information processing apparatus, an information processing system, and an information processing method.

According to the exemplary embodiment, it is possible to improve the operability of an input unit for changing the position or the image capturing direction of a virtual camera.

These and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

A game system according to an exemplary embodiment is described below. An example of the game system 1 according to the exemplary embodiment includes a main body apparatus (an information processing apparatus; which functions as a game apparatus main body in the exemplary embodiment) 2, and a left controller 3 and a right controller 4 and functions also as an information processing system. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
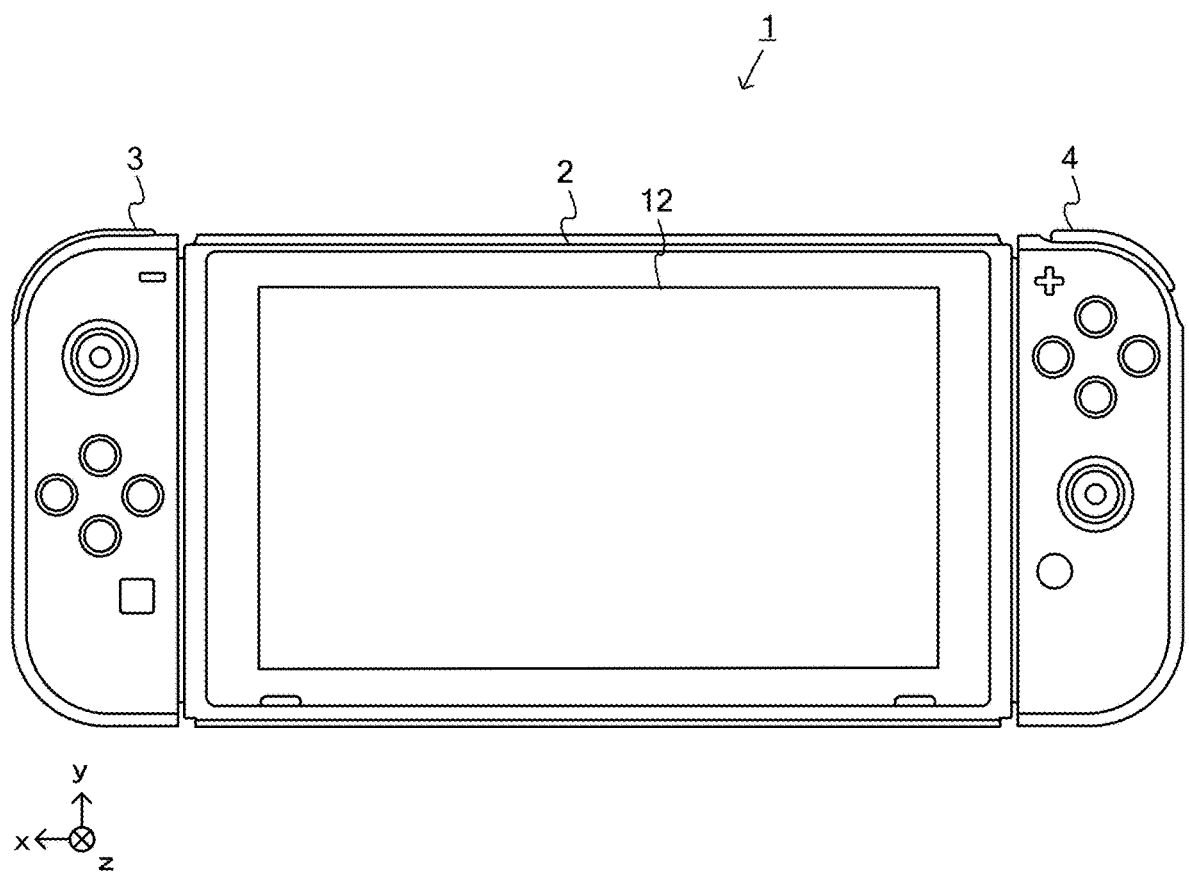
FIG. 1 is a diagram showing a non-limiting example of the state where a left controller 3 and a right controller 4 are attached to a main body apparatus 2.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
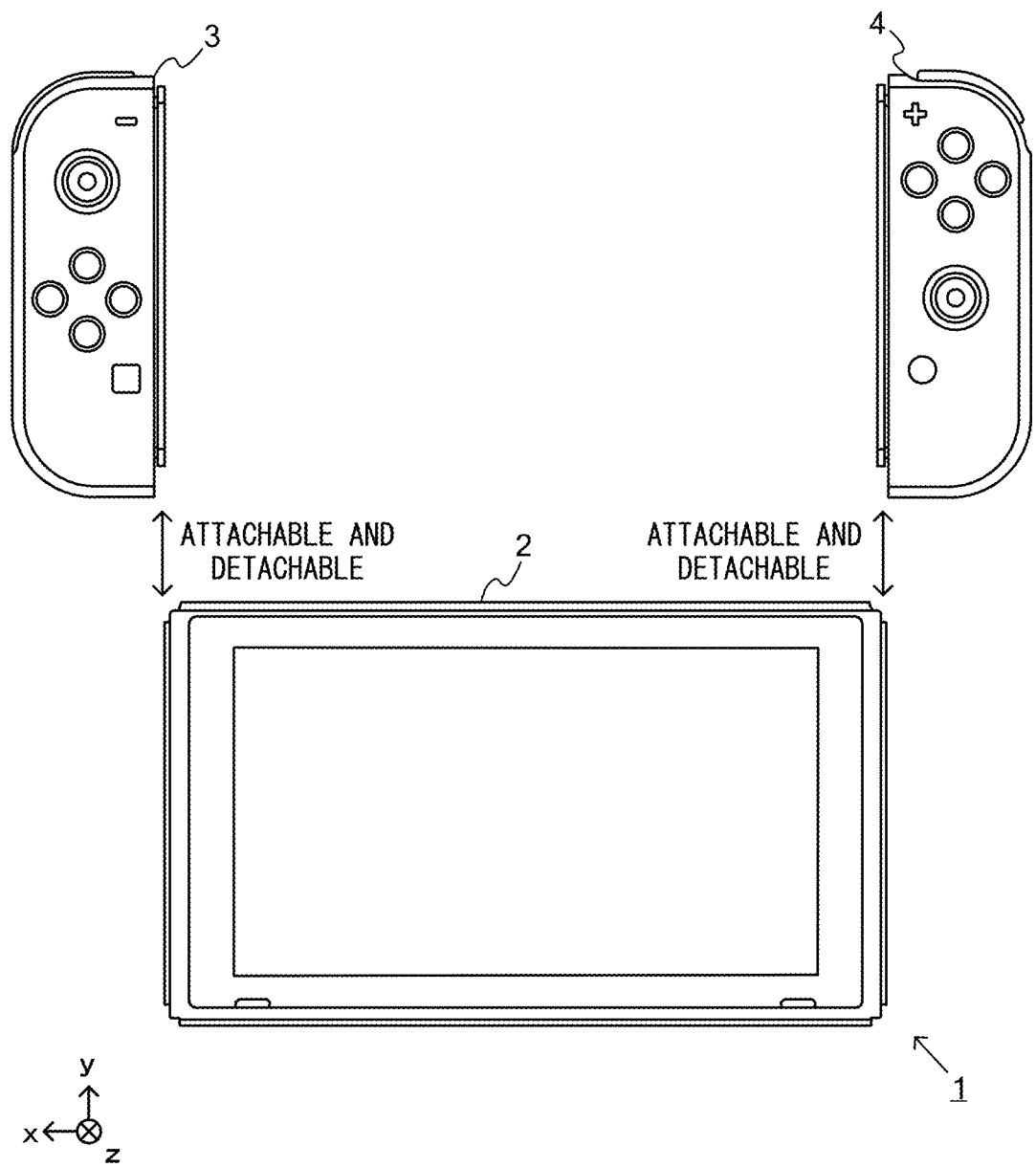
FIG. 2 is a diagram showing a non-limiting example of the state where each of the left controller 3 and the right controller 4 is detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
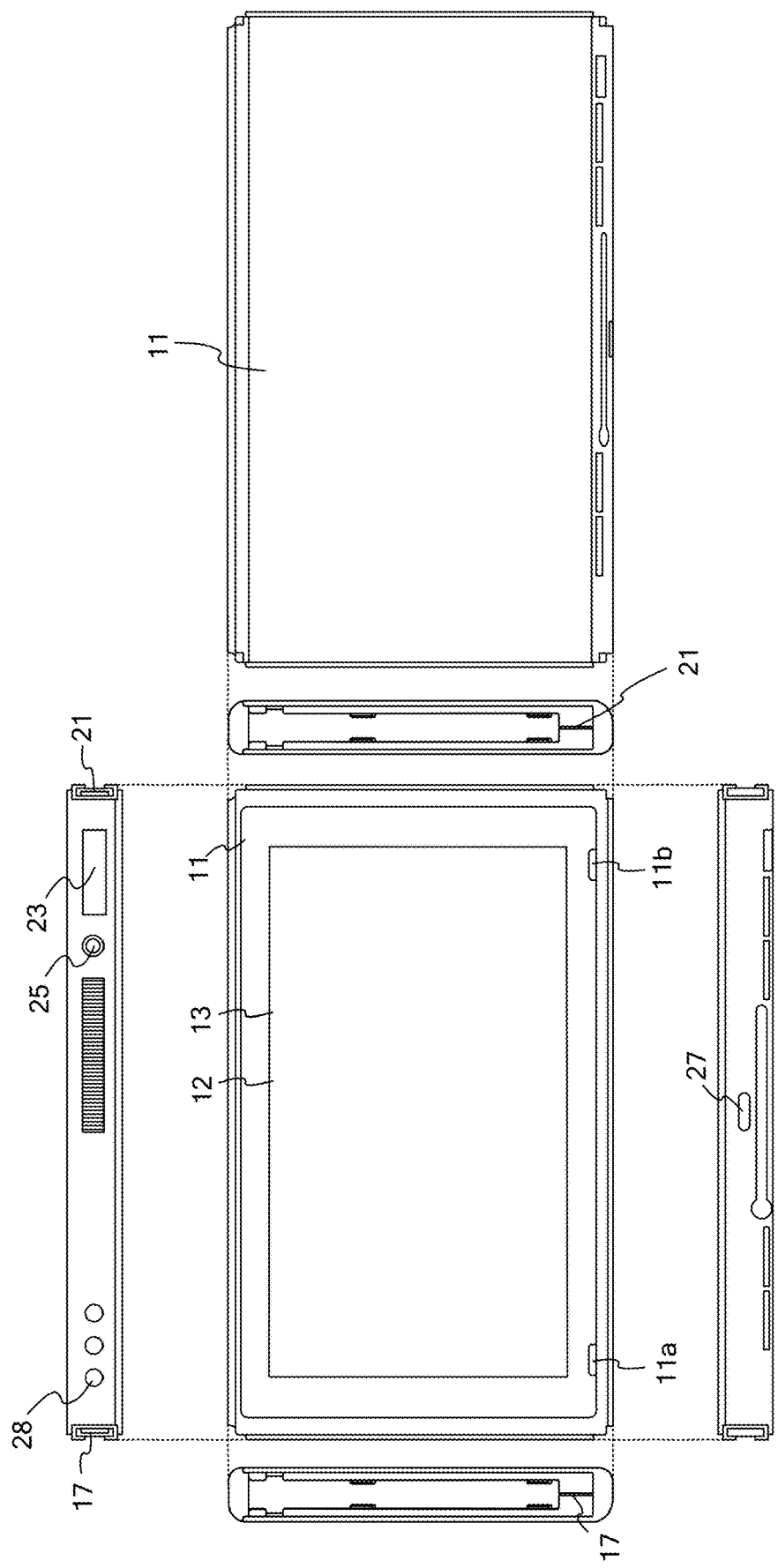
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
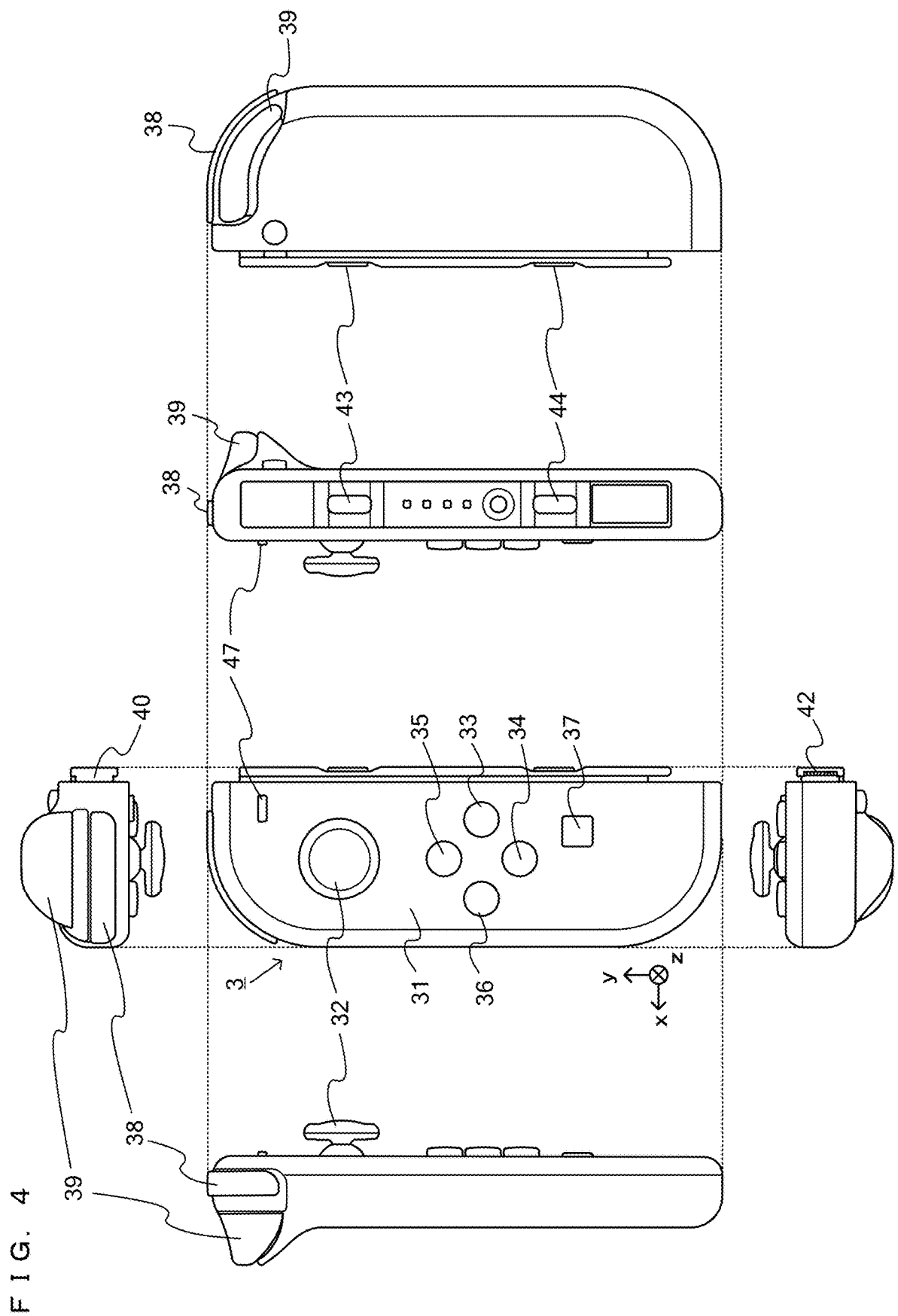
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
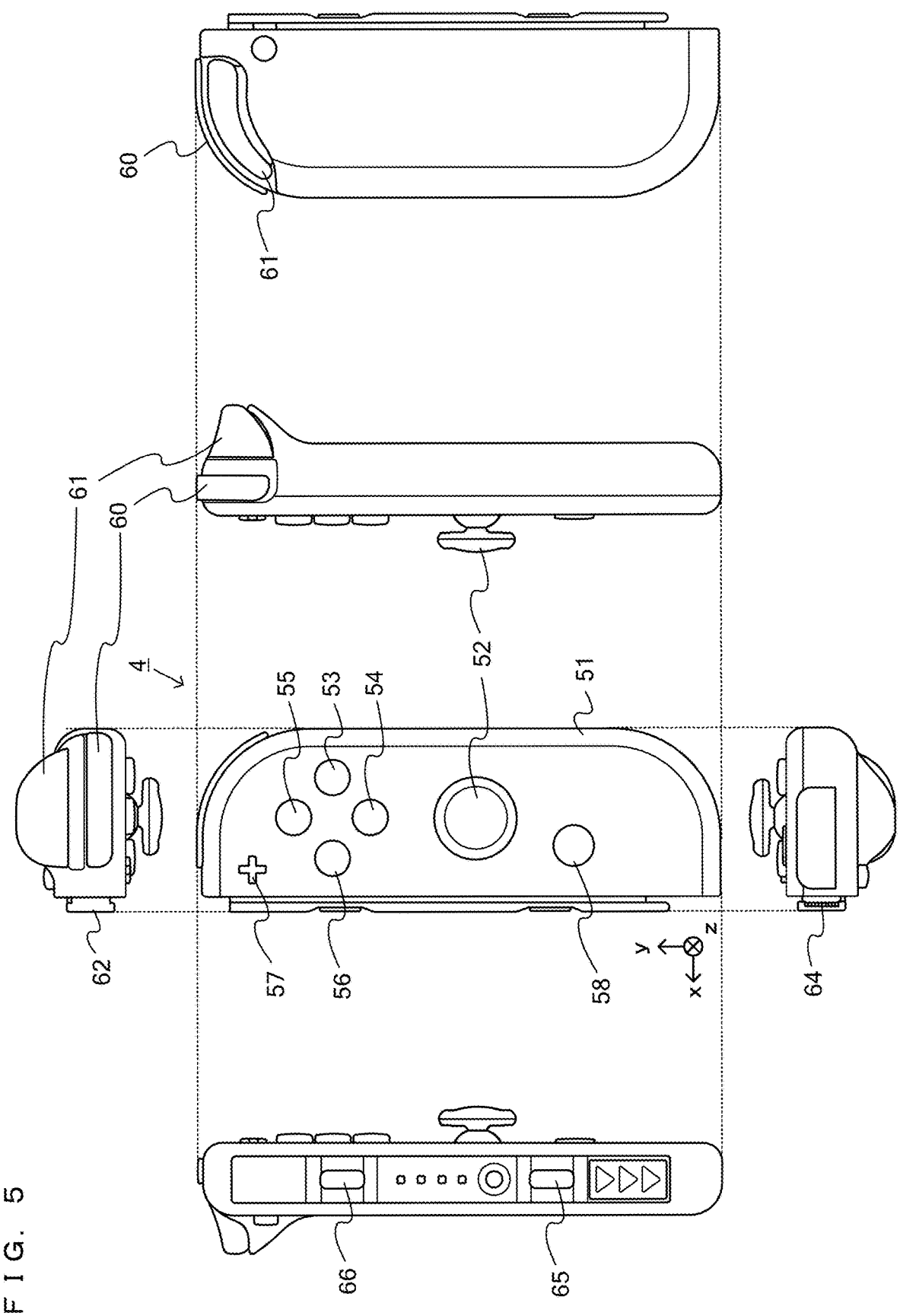
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
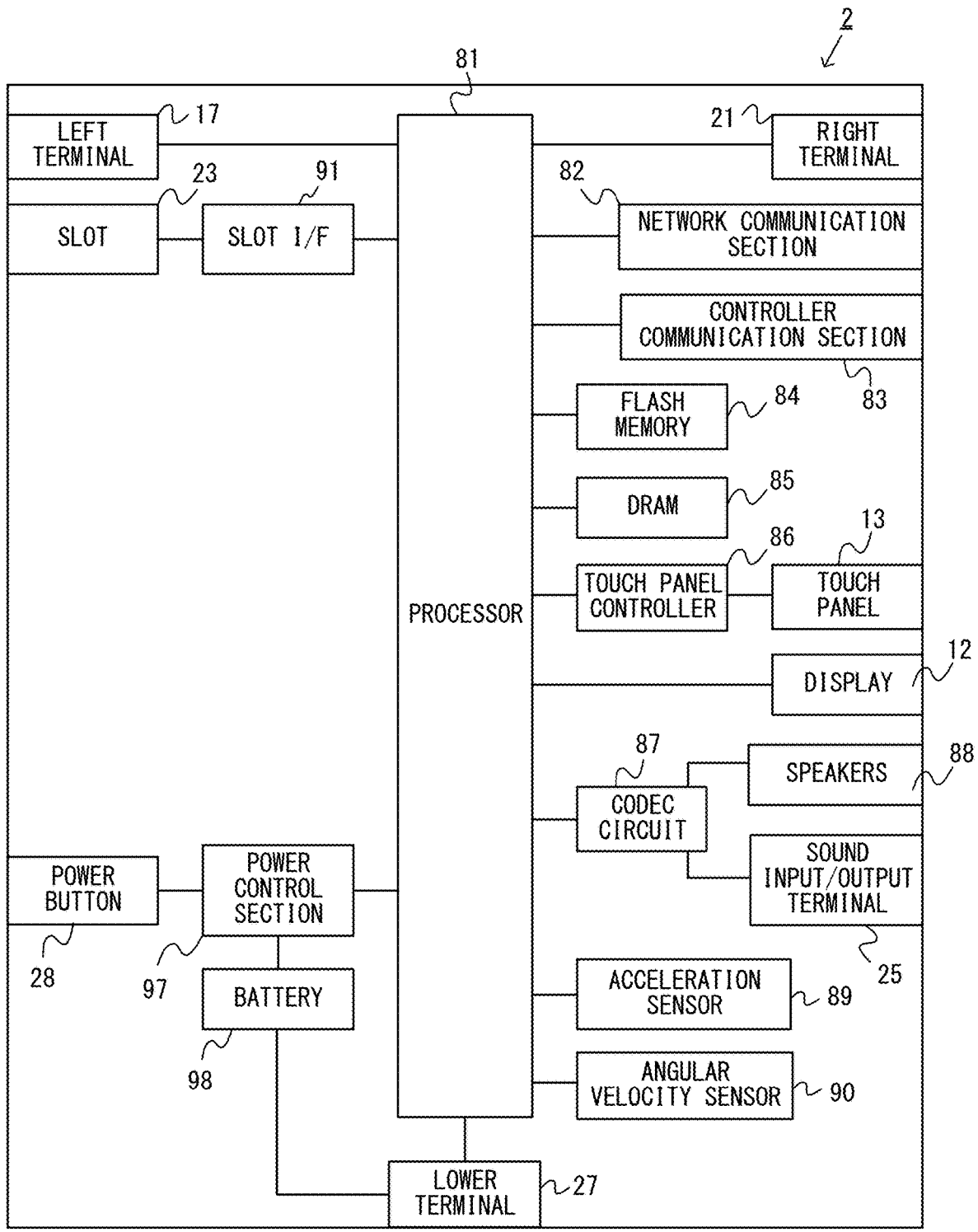
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
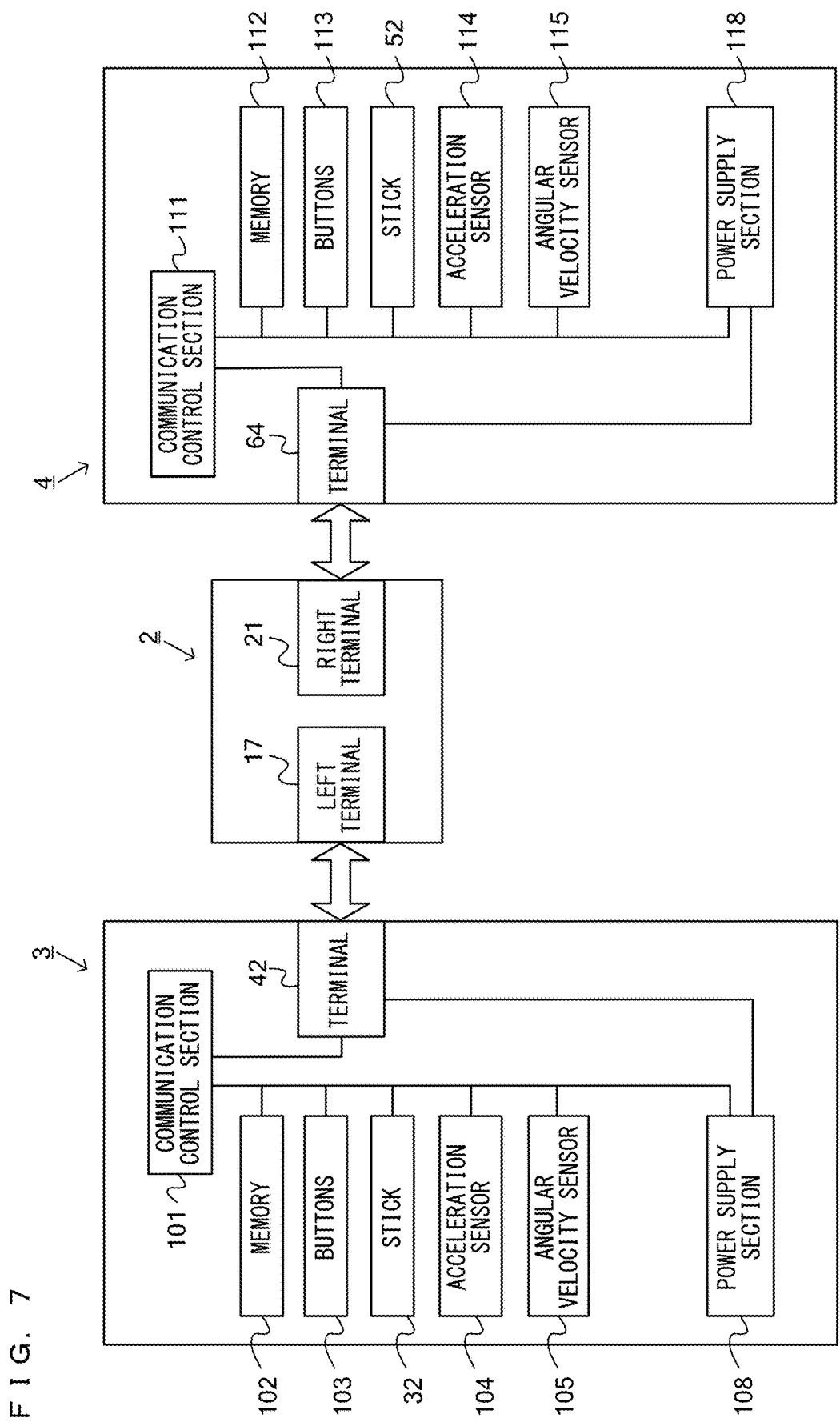
FIG. 7 is a block diagram showing non-limiting examples of the internal configurations of the main body apparatus 2, the left controller 3, and the right controller 4.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a processing section 121. The processing section 121 is connected to the communication control section 111.

The right controller 4 includes a power supply section 118. The power supply section 118 has a function similar to that of the power supply section 108 of the left controller 3 and operates similarly to the power supply section 108.

As describe above, in the game system 1 according to the exemplary embodiment, the left controller 3 and the right controller 4 are attachable to and detachable from the main body apparatus 2. Further, the unified apparatus obtained by attaching the left controller 3 and the right controller 4 to the main body apparatus 2 or the main body apparatus 2 alone is attached to the cradle and thereby can output an image (and a sound) to an external display device such as the stationary monitor. A description is given below using the game system 1 in the use form of the unified apparatus obtained by attaching the left controller 3 and the right controller 4 to the main body apparatus 2.

As described above, in accordance with operations on the operation buttons and the sticks of the left controller 3 and/or the right controller 4 in the game system 1 as the unified apparatus, a touch operation on the touch panel 13 of the main body apparatus 2, the operation of moving the entirety of the unified apparatus, and the like, game play using a virtual space displayed on the display 12 is performed. In the exemplary embodiment, as an example, in accordance with user operations using the above operation buttons, the sticks, and the inertial sensors, game play using a player object in a virtual space and objects placed in the virtual space.

Figure 8:
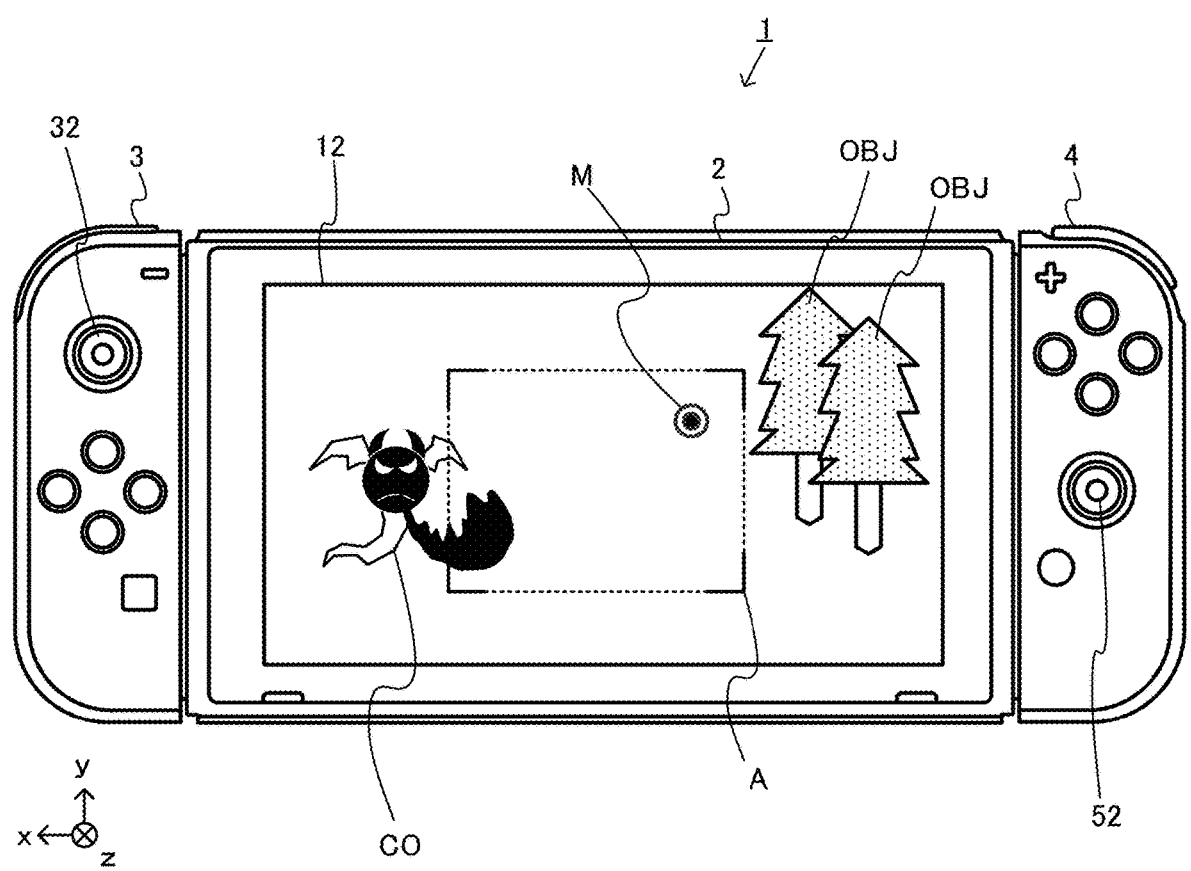
FIG. 8 is a diagram showing a non-limiting example of a game image displayed on a display 12 of the main body apparatus 2.
Figure 9:
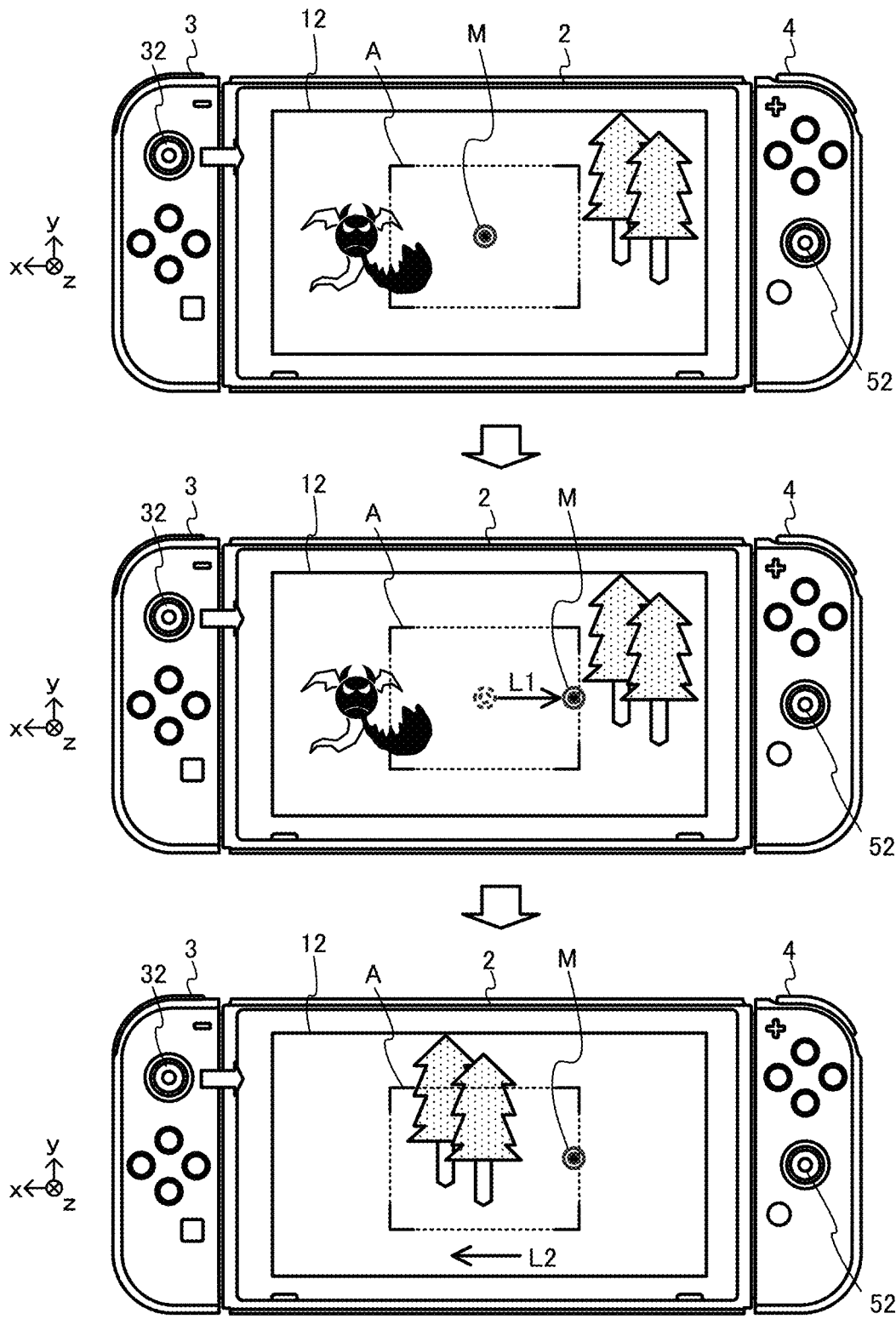
FIG. 9 is a diagram showing a non-limiting example of a game image displayed on the display 12 in accordance with a user operation using an analog stick 32 of the left controller 3.
Figure 10:
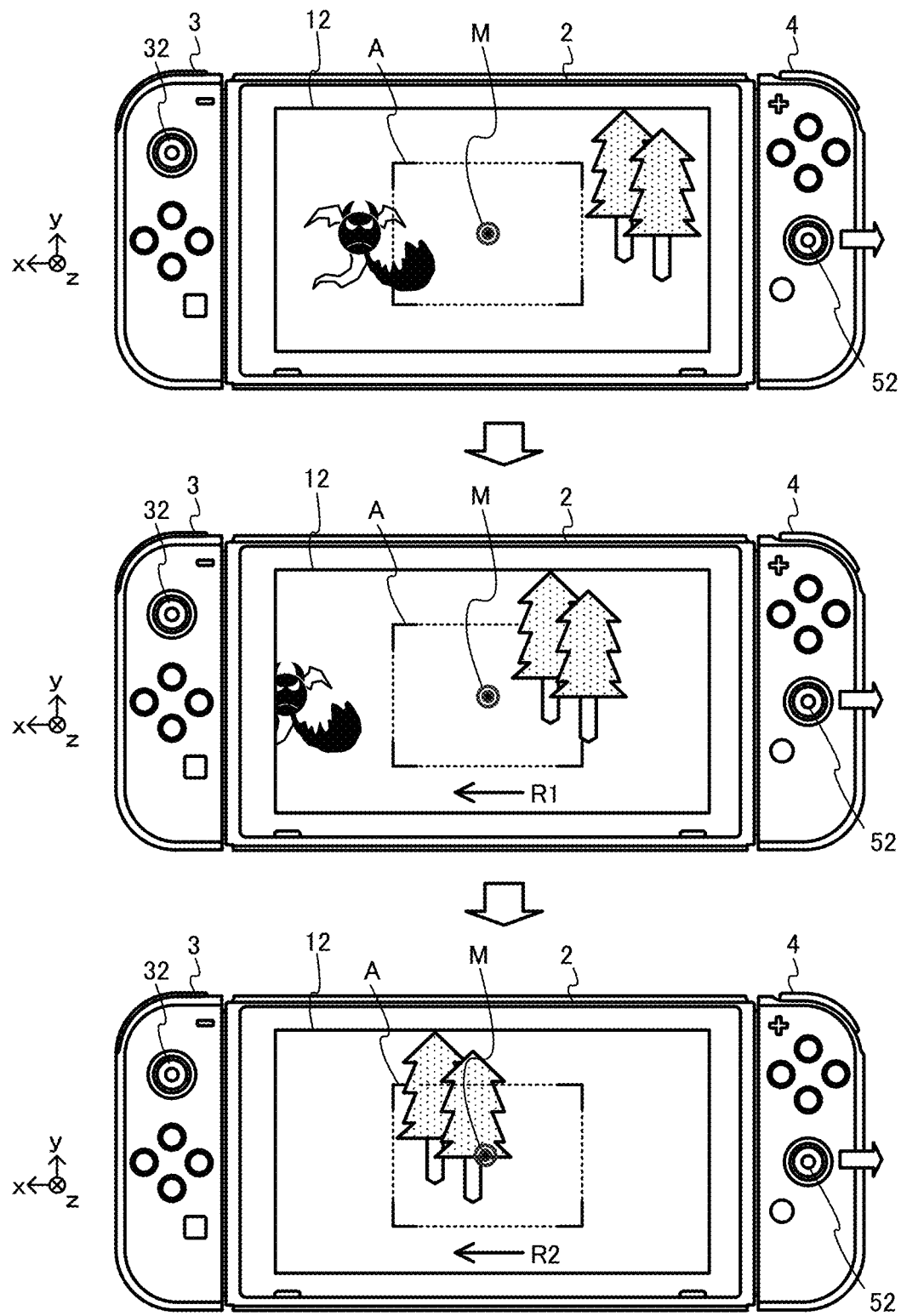
FIG. 10 is a diagram showing a non-limiting example of a game image displayed on the display 12 in accordance with a user operation using an analog stick 52 of the right controller 4.
Figure 11:
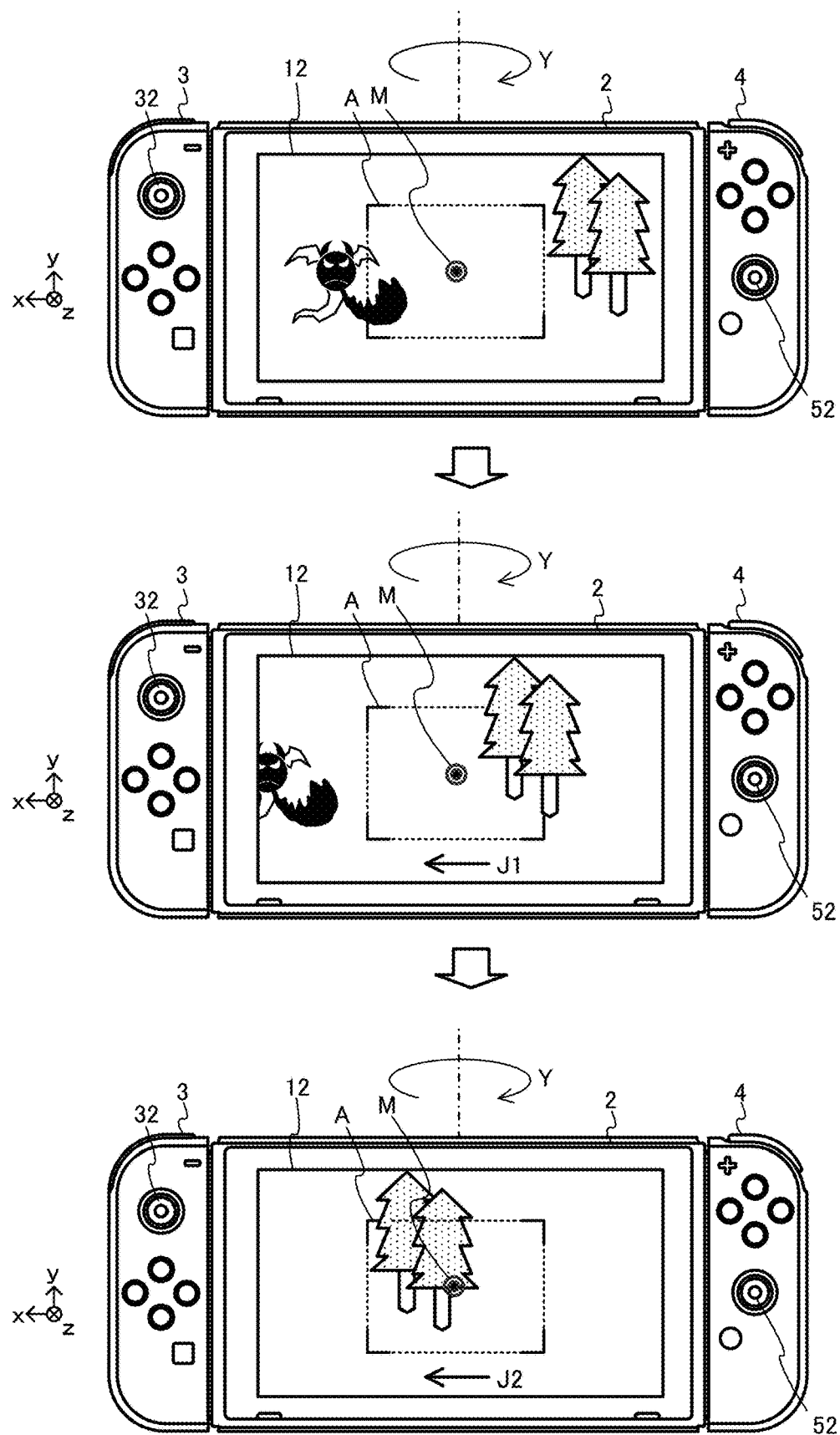
FIG. 11 is a diagram showing a non-limiting example of a game image displayed on the display 12 in accordance with a user operation using inertial sensors.

With reference to FIGS. 8 to 11, a description is given of an overview of game processing performed by the game system 1. FIG. 8 is a diagram showing an example of a game image displayed on the display 12 of the main body apparatus 2. FIG. 9 is a diagram showing of an example of a game image displayed on the display 12 in accordance with a user operation using the analog stick 32 (hereinafter referred to as the "left stick 32") of the left controller 3. FIG. 10 is a diagram showing an example of a game image displayed on the display 12 in accordance with a user operation using the analog stick 52 (hereinafter referred to as the "right stick 52") of the right controller 4. FIG. 11 is a diagram showing an example of a game image displayed on the display 12 in accordance with a user operation using the inertial sensors. Although a game is used as an example of an application executed by the game system 1 in the following description, another application may be executed by the game system 1. The left stick 32 is equivalent to an example of a first input unit, and the right stick 52 is equivalent to an example of a second input unit.

In FIG. 8, on the display 12 of the game system 1, a game image is displayed in which a character object CO and objects OBJ are placed in a virtual space. For example, as the game image, a first-person image viewed from a player object capable of moving in the virtual space on a vehicle that automatically moves along a path set in advance is displayed, and a game where the first-person image is captured in accordance with a predetermined user operation can be played. Thus, a virtual camera for generating the above game image can be moved in the virtual space together with the player object that automatically moves along the path set in advance. As will be apparent below, the direction of the virtual camera can be changed by a tilt operation on the left stick 32, a tilt operation on the right stick 52, and an operation using the inertial sensors by changing the orientation of the entirety of the unified apparatus. Here, in a case where the user operates the unified apparatus by holding the unified apparatus with both hands, an operation using a finger (e.g., the thumb) of the left hand of the user can be performed in the tilt operation on the left stick 32, an operation using a finger (e.g., the thumb) of the right hand of the user can be performed in the tilt operation on the right stick 52, and the operation of moving both hands (both arms) of the user can be performed in the operation using the inertial sensors by changing the orientation of the entirety of the unified apparatus. The player object may be configured to move in the virtual space in accordance with a user operation different from the above operations of changing the direction of the virtual camera. The entirety of the unified apparatus on which the operation using the inertial sensors by changing the orientation of the unified apparatus can be performed is equivalent to an example of a third input unit.

In the game image, a pointer M is displayed. The pointer M functions as an indicator for the user to specify a part of the virtual space that is being displayed. For example, game processing based on a position or a direction in the virtual space determined based on the display position of the pointer M is performed. As an example, a game is performed where a virtual object is fired at the position or in the direction in the virtual space determined based on the display position of the pointer M. The display position of the pointer M can be changed by the tilt operation on the left stick 32, and in accordance with a predetermined operation (e.g., the operation of pressing the A-button 53 or the B-button 54), a virtual object (e.g., a fruit object, a ball object, or the like) is fired at the position or in the direction in the virtual space determined based on the display position of the pointer M. In the above game processing, a shooting game may be performed where a target placed in the virtual space is shot by firing a bullet object, a bombshell object, or the like at a position or in a direction in the virtual space determined based on the position of a pointer displayed on the screen.

The pointer M can move only in a movable range A. For example, the movable range A is set as a range indicating a part of a display screen. Although FIGS. 8 to 11 show the movable range A for convenience of description, the movable range A may not need to be displayed in the actual game image, and a guide frame indicating a part (e.g., the four corners) of the outer frame of the movable range A may be displayed. As an example, the movable range A is set in a rectangular range placed at the center of the display screen, and the width and the height of the movable range A are set to lengths shorter than the entire width and the entire height (e.g., about a third of the entire width and a half of the entire height) of the display screen. The movable range A may be set off the center of the display screen. The shape of the movable range A may not be a rectangle, and may be another polygon shape, a circle, an ellipse, a semicircle, a fan shape, or the like.

The pointer M may be displayed by being placed in the virtual space, or may be displayed by being combined with a virtual space image. In the first case, as an example, in the virtual space where the player object, the character object CO, the objects OBJ, and the like are placed, a virtual plane including a main surface perpendicular to the direction of the line of sight of the virtual camera is placed, and the pointer M is pasted to the main surface of the plane. Consequently, the pointer M can move two-dimensionally by translating on the plane. In the first case, as another example, the virtual space where the pointer M is placed on a game field or the surface of an object in the virtual space is generated. Consequently, the pointer M can move three-dimensionally in left, right, up, down, front, and back directions in the virtual space. The image thus rendered including the pointer M is generated, whereby a game image in which the pointer M is placed can be displayed on the display 12. In the second case, the pointer M is combined in a superimposed manner with a virtual space image in which the player object, the character object CO, the objects OBJ, and the like are rendered, whereby a game image can be displayed on the display 12. Consequently, the pointer M can be displayed in a superimposed manner such that the pointer M moves two-dimensionally.

With reference to FIG. 9, a pointer operation and an edge portion operation through the left stick 32 are described. In the exemplary embodiment, by the operation of tilting the left stick 32, it is possible to perform the operation of moving the pointer M in the movable range A (a pointer operation) and the operation of changing the direction of the virtual camera after the pointer M reaches an edge portion of the movable range A (an edge portion operation).

In the upper diagram of FIG. 9, a game image in which the character object and the objects are placed in the virtual space is displayed on the display 12. Then, the movable range A is set at the center of the display 12, and the pointer M is displayed at a default position (the center of the movable range A). A case is described where, in the state where such a game image is displayed on the display 12, a tilt operation for tilting the left stick 32 to the right (the operation of tilting the left stick in a negative x-axis direction; an operation in the direction of an arrow shown in the upper diagram of FIG. 9).

In the middle diagram of FIG. 9, if the tilt operation for tilting the left stick 32 to the right is performed, the display position of the pointer M moves to the right (an arrow L1 shown in the middle diagram of FIG. 9; the negative x-axis direction shown in the middle diagram of FIG. 9). For example, a moving direction in which the pointer M moves is the same direction as the tilt direction of the left stick 32. The amount of movement of the pointer M is controlled based on a moving velocity calculated based on the tilt angle of the left stick 32 (the larger the tilt angle is, the faster the moving velocity is). Then, if the pointer M reaches an edge portion of the movable range A, the movement of the pointer M stops. For example, in the example of the middle diagram of FIG. 9, the pointer M moving in the right direction of the display screen reaches the right edge of the movable range A, thereby being displayed by stopping at the position where the movable range A reaches the right edge of the movable range A. Then, the pointer M cannot move over the right edge of the movable range A.

In the lower diagram of FIG. 9, if the tilt operation for tilting the left stick 32 to the right is further performed in the state where the pointer M reaches the right edge of the movable range A and stops, the virtual camera rotates to the right in the state where the display position of the pointer M is maintained, thereby changing the image capturing direction of the virtual camera. By this right rotation of the virtual camera, the display range of the virtual space displayed on the display 12 also moves in the right direction. Thus, the display target in the virtual space displayed on the display 12 is displayed by moving to the left (an arrow L2 shown in the lower diagram of FIG. 9) (e.g., in the example of the middle diagram to the lower diagram of FIG. 9, tree objects displayed on the right side are displayed near the center). For example, the direction in which the virtual camera rotates is the same direction as the tilt direction of the left stick 32. The amount of rotation of the virtual camera is controlled based on a rotational velocity calculated based on the tilt angle of the left stick 32 (the larger the tilt angle is, the faster the rotational velocity is). As described above, in the exemplary embodiment, in a case where the pointer M is located in an edge portion of the movable range A, and if a tilt operation for indicating the direction from the edge portion to outside the movable range A through the left stick 32 (the edge portion operation) is performed, the image capturing direction of the virtual camera is changed in accordance with the direction of the tilt operation.

There can be a case where, even if the pointer M is displayed in an edge portion of the movable range A, the pointer M moves in the movable range A by the tilt operation on the left stick 32. As a first example, in a case where the pointer M is located in an edge portion of the movable range A, and if a tilt operation for indicating the direction from the edge portion to inside the movable range A through the left stick 32 (e.g., a tilt operation in the direction in which, after the pointer M reaches an edge portion of the movable range A, the moving direction of the pointer M is returned) is performed, the pointer M moves toward the inside of the movable range A. As a second example, after the pointer M reaches an edge portion of the movable range A, and if a tilt operation in a tilt direction having a component of a direction along the edge portion is performed, the pointer M moves along the edge portion. For example, as in the examples of the middle diagram and the lower diagram of FIG. 9, if the pointer M is displayed at the right edge of the movable range A, the pointer M cannot move in the right direction of the display screen, but can move in the up direction or the down direction along the right edge. Specifically, in the state where the pointer M is displayed at the right edge of the movable range A, and if a tilt operation is performed through the left stick 32 such that the up direction (a positive y-axis direction shown in the middle diagram or the lower diagram of FIG. 9) or the upper right direction of the display screen is the tilt direction, the pointer M moves in the up direction along the right edge until the pointer M reaches the upper edge of the movable range A.

In the exemplary embodiment, both the pointer operation for moving the pointer M and the edge portion operation for changing the direction of the virtual camera can also be performed by the tilt operation through the left stick 32. The movable range A in the exemplary embodiment has a left-right range where the pointer M can move in the left-right direction, and an up-down range where the pointer M can move in the up-down direction. Then, if an instruction to move the pointer M in the left-right direction beyond the left-right range is given by the tilt operation on the left stick 32, the movement of the pointer M is stopped within the left-right range, and the subsequent tilt operation shifts to an instruction to rotate the virtual camera in the left-right direction. If an instruction to move the pointer M in the up-down direction beyond the up-down range is given by the tilt operation on the left stick 32, the movement of the pointer M is stopped within the up-down range, and the subsequent tilt operation shifts to an instruction to rotate the virtual camera in the up-down direction. Thus, if a tilt operation on the left stick 32 in a tilt direction having both a component of the left-right direction and a component of the up-down direction (e.g., a tilt operation in the upper left direction) is performed, and even if the tilt operation is a tilt operation for moving the pointer M beyond one of the ranges, the tilt operation can also be a tilt operation for moving the pointer M not beyond the other range. In this case, in the direction of the one range in which the movement of the pointer M is beyond the one range, the tilt operation shifts to an instruction to rotate the virtual camera, while in the direction of the other range in which the movement of the pointer M is not beyond the other range, the pointer M continues to move. Both the pointer operation for moving the pointer M and the edge portion operation for changing the direction of the virtual camera are simultaneously performed by the tilt operation through the left stick 32.

Even in the state where the pointer M moves in the movable range A by the tilt operation through the left stick 32, the direction of the virtual camera may be changed together with the movement of the pointer M. As an example, only in the state where the pointer M moves in a predetermined direction (e.g., the up-down direction) in the movable range A, the direction of the virtual camera may be changed in the predetermined direction (e.g., the up-down direction) together with the movement of the pointer M in the predetermined direction.

It goes without saying that even in the state where the display position of the pointer M is maintained, the display range of the virtual space changes, whereby the position or the direction in the virtual space determined based on the display position of the pointer M changes.

With reference to FIG. 10, a first virtual camera operation through the right stick 52 is described. In the exemplary embodiment, by the operation of tilting the right stick 52, it is possible to perform the operation of changing the direction of the virtual camera without moving the pointer M on the display screen (a first virtual camera operation).

In the upper diagram of FIG. 10, a game image in which the character object and the objects are placed in the virtual space is displayed on the display 12. Then, the movable range A is set at the center of the display 12, and the pointer M is displayed at a default position (the center of the movable range A). A case is described where, in the state where such a game image is displayed on the display 12, a tilt operation for tilting the right stick 52 to the right (the operation of tilting the right stick in a negative x-axis direction; an operation in the direction of an arrow shown in the upper diagram of FIG. 10).

In the middle diagram of FIG. 10, if the tilt operation for tilting the right stick 52 to the right is performed, the virtual camera rotates to the right in the state where the display position of the pointer M is maintained, thereby changing the image capturing direction of the virtual camera. By this right rotation of the virtual camera, the display range of the virtual space displayed on the display 12 also moves in the right direction. Thus, the display target in the virtual space displayed on the display 12 is displayed by moving to the left (an arrow R1 shown in the middle diagram of FIG. 10). For example, the direction in which the virtual camera rotates is the same direction as the tilt direction of the right stick 52. The amount of rotation of the virtual camera is controlled based on a rotational velocity calculated based on the tilt angle of the right stick 52 (the larger the tilt angle is, the faster the rotational velocity is).

In the lower diagram of FIG. 10, if the tilt operation for tilting the right stick 52 to the right is further performed, the virtual camera rotates further to the right in the state where the display position of the pointer M is maintained, thereby changing the image capturing direction of the virtual camera. By this right rotation of the virtual camera, the display range of the virtual space displayed on the display 12 also moves further in the right direction. Thus, the display target in the virtual space displayed on the display 12 is displayed by moving further to the left (an arrow R2 shown in the lower diagram of FIG. 10) (e.g., in the example of the upper diagram to the lower diagram of FIG. 10, tree objects displayed on the right side are displayed near the center). As described above, in the exemplary embodiment, if a tilt operation through the right stick 52 is performed, the image capturing direction of the virtual camera is changed in accordance with the direction of the tilt operation in the state where the display position of the pointer M is maintained.

With reference to FIG. 11, a second virtual camera operation using the inertial sensors by changing the orientation of the entirety of the unified apparatus is described. In the exemplary embodiment, by the operation of changing the orientation of the entirety of the unified apparatus, it is possible to perform the operation of changing the direction of the virtual camera (a second virtual camera operation) without moving the pointer M on the display screen. The inertial sensors used to detect a change in the orientation of the entirety of the unified apparatus may be the angular velocity sensors included in the unified apparatus, or may be the acceleration sensors included in the unified apparatus, or may be both the angular velocity sensors and the acceleration sensors. The angular velocity sensors used to detect a change in the orientation of the entirety of the unified apparatus may be at least one of the angular velocity sensor 90 included in the main body apparatus 2, the angular velocity sensor 105 included in the left controller 3, and the angular velocity sensor 115 included in the right controller 4. The acceleration sensors used to detect a change in the orientation of the entirety of the unified apparatus may be at least one of the acceleration sensor 89 included in the main body apparatus 2, the acceleration sensor 104 included in the left controller 3, and the acceleration sensor 114 included in the right controller 4.

In the upper diagram of FIG. 11, a game image in which the character object and the objects are placed in the virtual space is displayed on the display 12. Then, the movable range A is set at the center of the display 12, and the pointer M is displayed at a default position (the center of the movable range A). A case is described where, in the state where such a game image is displayed on the display 12, a (yawing) operation for yawing the orientation of the entirety of the unified apparatus to the right (the operation of rotating the entirety of the unified apparatus such that the depth direction of the display screen moves to the right about a y-axis direction shown in the upper diagram of FIG. 11; an operation in a Y-direction shown in the upper diagram of FIG. 11).

In the middle diagram of FIG. 11, if the operation of yawing the entirety of the unified apparatus to the right is performed, the virtual camera rotates to the right in the state where the display position of the pointer M is maintained, thereby changing the image capturing direction of the virtual camera. By this right rotation of the virtual camera, the display range of the virtual space displayed on the display 12 also moves in the right direction. Thus, the display target in the virtual space displayed on the display 12 is displayed by moving to the left (an arrow J1 shown in the middle diagram of FIG. 11). For example, the direction in which the virtual camera rotates is the same direction as the rotational direction (the yaw direction) in which the entirety of the unified apparatus yaws to the right. The amount of rotation of the virtual camera is controlled so that the virtual camera rotates at the same angle as the angle of rotation (the yaw angle) at which the entirety of the unified apparatus yaws to the right.

Here, a change in the orientation of the virtual camera by the second virtual camera operation may be made similarly to a change in the orientation of the unified apparatus from a reference orientation set for the unified apparatus (the amount of angular change from the reference orientation with respect to each of yaw, pitch, and roll directions). Specifically, in accordance with the direction of change in the orientation of the unified apparatus with respect to the reference orientation of the unified apparatus in real space, the orientation of the virtual camera in the virtual space is changed from a reference orientation in the same direction as the change in the orientation of the unified apparatus. Then, the orientation of the virtual camera in the virtual space is changed from the reference orientation by the same amount as the amount of change in the orientation of the unified apparatus with respect to the reference orientation of the unified apparatus in real space. The amount by which the orientation of the virtual camera is changed may be different from the amount of change in the orientation of the unified apparatus with respect to the reference orientation of the unified apparatus, and may be greater or smaller than the amount of change in the orientation of the unified apparatus. In the exemplary embodiment, after the tilt operations on the sticks (the tilt operations on the left stick 32 and/or the right stick 52) are started and at the time when the tilt operations end, the reference orientation of the unified apparatus is set, and the orientation of the unified apparatus in real space at this time is reset as a new reference orientation. Also regarding the reference orientation of the virtual camera in the virtual space, the orientation of the virtual camera in the virtual space at this time is also reset as a new reference orientation.

As another example, a change in the orientation of the virtual camera by the second virtual camera operation may be controlled based on the direction of change in the orientation of the unified apparatus and the amount of change in the orientation of the unified apparatus in each processing cycle (frame). For example, based on the direction of change in the orientation and the amount of change in the orientation of the unified apparatus in real space from the previous frame, the direction and the amount in and by which the orientation of the virtual camera in the virtual space is to be changed may be determined. In this example, as described below, while the processes based on the stick operations (the tilt operations on the left stick 32 and/or the right stick 52) are performed, and if the second virtual camera operation using the inertial sensors by changing the orientation of the entirety of the unified apparatus is performed, the above process of determining the direction and the amount in and by which the orientation of the virtual camera is to be changed based on changes in the unified apparatus in each processing cycle may not be performed, thereby setting the amount of change in the image capturing direction of the virtual camera based on the second virtual camera operation while the processes based on the stick operations are performed to 0.

In the lower diagram of FIG. 11, if the operation of yawing the entirety of the unified apparatus further to the right is performed, the virtual camera rotates further to the right in the state where the display position of the pointer M is maintained, thereby changing the image capturing direction of the virtual camera. By this right rotation of the virtual camera, the display range of the virtual space displayed on the display 12 also moves further in the right direction. Thus, the display target in the virtual space displayed on the display 12 is displayed by moving further to the left (an arrow J2 shown in the lower diagram of FIG. 11) (e.g., in the example of the upper diagram to the lower diagram of FIG. 11, tree objects displayed on the right side are displayed near the center). As described above, in the exemplary embodiment, if the operation of changing the orientation of the entirety of the unified apparatus is performed, the image capturing direction of the virtual camera is changed in accordance with the direction of change in the orientation and the amount of change in the orientation of the entirety of the unified apparatus in the state where the display position of the pointer M is maintained.

In the exemplary embodiment, if the above three user operations are redundantly performed, the following types of control (a) to (d) are performed.

(a) In a case where the second virtual camera operation using the inertial sensors by changing the orientation of the entirety of the unified apparatus is performed while the process of moving the pointer M or the process of changing the image capturing direction of the virtual camera is performed based on the tilt operation on the left stick 32, the absolute value of the quantity of change in the image capturing direction of the virtual camera based on the second virtual camera operation is reduced as compared with a case where the second virtual camera operation is performed when the process based on the tilt operation on the left stick 32 is not performed. For example, the absolute value of the quantity of change in the image capturing direction of the virtual camera based on the second virtual camera operation is set to 0, reduced to 30%, reduced to 50%, or reduced to 80% as compared with a case where second virtual camera operation is performed when the process based on the tilt operation on the left stick 32 is not performed. The above setting of the quantity of change in the image capturing direction of the virtual camera to 0 includes disabling control of the virtual camera by the second virtual camera operation and includes setting the quantity of change in the image capturing direction of the virtual camera to substantially 0.

(b) In a case where the second virtual camera operation using the inertial sensors by changing the orientation of the entirety of the unified apparatus is performed while the process of changing the image capturing direction of the virtual camera is performed based on the tilt operation on the right stick 52 (the first virtual camera operation), the absolute value of the quantity of change in the image capturing direction of the virtual camera based on the second virtual camera operation is reduced as compared with a case where the second virtual camera operation is performed when the process based on the first virtual camera operation is not performed. For example, the absolute value of the quantity of change in the image capturing direction of the virtual camera based on the second virtual camera operation is set to 0, reduced to 30%, reduced to 50%, or reduced to 80% as compared with a case where the second virtual camera operation is performed when the process based on the tilt operation on the right stick 52 is not performed.

(c) In a case where the first virtual camera operation using the right stick 52 is performed while the process of moving the pointer M is performed based on the tilt operation on the left stick 32, both the process of moving the pointer M and the process of changing the image capturing direction of the virtual camera based on the first virtual camera operation are performed.

(d) In a case where the first virtual camera operation using the right stick 52 is performed while the process of changing the image capturing direction of the virtual camera is performed based on the tilt operation on the left stick 32, the image capturing direction of the virtual camera is changed by a quantity of change obtained by adding the quantity of change by which the image capturing direction of the virtual camera is changed based on the tilt operation on the left stick 32 and the quantity of change by which the image capturing direction of the virtual camera is changed based on the first virtual camera operation. The above addition may be made after reducing at least one of the absolute values of the quantities of change to be added. In either case, if the quantity of change by which the image capturing direction of the virtual camera is changed in a left-right direction component based on the tilt operation on the left stick 32 and the quantity of change by which the image capturing direction of the virtual camera is changed in the left-right direction component based on the first virtual camera operation are both positive, the image capturing direction of the virtual camera is changed by a quantity of change greater than either of the quantities of change in the left-right direction component. If the quantities of change are both negative, the image capturing direction of the virtual camera is changed by a quantity of change smaller than either of the quantities of change in the left-right direction component. If the quantity of change by which the image capturing direction of the virtual camera is changed in an up-down direction component based on the tilt operation on the left stick 32 and the quantity of change by which the image capturing direction of the virtual camera is changed in the up-down direction component based on the first virtual camera operation are both positive, the image capturing direction of the virtual camera is changed by a quantity of change greater than either of the quantities of change in the up-down direction component. If the quantities of change are both negative, the image capturing direction of the virtual camera is changed by a quantity of change smaller than either of the quantities of change in the up-down direction component. The quantity of change used in the exemplary embodiment is a quantity that can take a negative value, and as an example, may be a vector quantity having positivity and negativity. A "small quantity of change" in a negative quantity of change does not mean that the absolute value of the quantity of change is small, but means that the quantity of change having a negative value is mathematically small (the absolute value of the quantity of change is great). There can also be a case where, based on the directions in which the image capturing direction of the virtual camera is changed by two operations, both the quantities of change in these directions are added together, thereby balancing out at least parts of the quantities of change.

The above types of control (a) to (d) are thus performed, whereby, if the processes by the stick operations (the tilt operations on the left stick 32 and/or the right stick 52) and the process by the operation of changing the orientation of the entirety of the unified apparatus are simultaneously performed, the effect of the process by the operation of changing the orientation of the entirety of the unified apparatus on the virtual camera is reduced (e.g., disabled). Consequently, it is possible to prevent the movement of the virtual camera due to the movement of the apparatus itself without the user's intention in the state where game play by the stick operations is performed. Thus, it is possible to expect stable game play and improve operability. If the process by the tilt operation on the left stick 32 and the process by the tilt operation on the right stick 52 are simultaneously performed, the processes are performed in parallel with each other, or the effects of the processes on the virtual camera are combined (e.g., added) together. Consequently, this is suitable in a case where a user wishes to quickly move the display range of a virtual space displayed on a display screen, and improves the operability of control of a virtual camera. This is also suitable in a case where a user wishes to move the display range of a virtual space displayed on a display screen while moving the display position of a pointer. Thus, it is possible to perform the operation of achieving both control of the display position of a pointer and control of a virtual camera.

In the above exemplary embodiment, an example has been used where the direction of the virtual camera is changed by the stick operations (the tilt operations on the left stick 32 and/or the right stick 52) or the operation of changing the orientation of the entirety of the unified apparatus. Alternatively, another parameter of the virtual camera may be changed. For example, the position of the virtual camera in the virtual space may be changed by the stick operations or the operation of changing the orientation of the entirety of the unified apparatus. As an example, the position of the virtual camera may be changed by setting the moving direction of the virtual camera in accordance with the tilt directions in which the tilt operations are performed on the sticks or the direction in which the orientation of the entirety of the unified apparatus changes, and setting the moving velocity or the quantity of movement of the virtual camera in accordance with the tilt angles at which the tilt operations are performed on the sticks or the angle at which the orientation of the entirety of the unified apparatus changes. Alternatively, both the direction and the position of the virtual camera in the virtual space may be changed by the stick operations or the operation of changing the orientation of the entirety of the unified apparatus. In accordance with the above changes in the direction and/or position of the virtual camera, the direction and/or the position of the player object for which the first-person image is generated may also be changed.

In the above exemplary embodiment, using as a condition the determination of whether or not a process based on a user operation is performed, control of the virtual camera by another user operation is adjusted. Alternatively, control of the virtual camera based on another condition may be performed. For example, using as a condition the determination of whether or not a user operation is performed, control of the virtual camera by another user operation may be adjusted.

Figure 12:
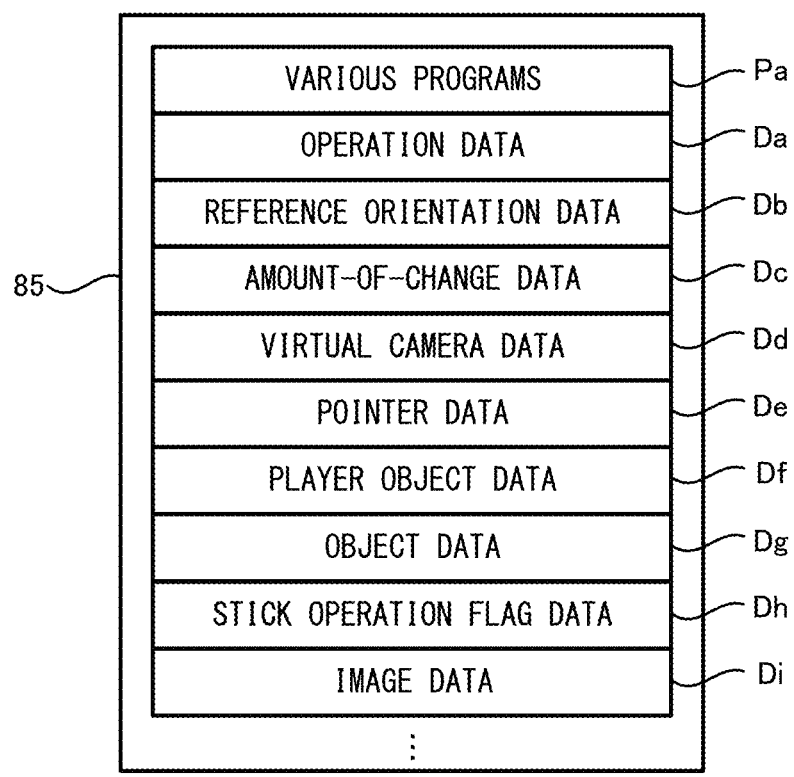
FIG. 12 is a diagram showing a non-limiting example of a data area set in a DRAM 85 of the main body apparatus 2 in the exemplary embodiment.

Next, with reference to FIGS. 12 to 16, a description is given of an example of a specific process executed by the game system 1 in the exemplary embodiment. FIG. 12 is a diagram showing an example of a data area set in the DRAM 85 of the main body apparatus 2 in the exemplary embodiment. It should be noted that in the DRAM 85, in addition to the data shown in FIG. 12, data used in another process is also stored, but is not described in detail here.

In a program storage area of the DRAM 85, various programs Pa, which are executed by the game system 1, are stored. In the exemplary embodiment, as the various programs Pa, an application program for performing information processing based on data acquired from the left controller 3 and/or the right controller 4 (e.g., a game program) and the like are stored. It should be noted that the various programs Pa may be stored in advance in the flash memory 84, or may be acquired from a storage medium attachable to and detachable from the game system 1 (e.g., a predetermined type of a storage medium attached to the slot 23) and stored in the DRAM 85, or may be acquired from another apparatus via a network such as the Internet and stored in the DRAM 85. The processor 81 executes the various programs Pa stored in the DRAM 85.

Further, in a data storage area of the DRAM 85, various data used for processes such as information processing executed by the game system 1 is stored. In the exemplary embodiment, in the DRAM 85, operation data Da, reference orientation data Db, amount-of-change data Dc, virtual camera data Dd, pointer data De, player object data Df, object data Dg, stick operation flag data Dh, image data Di, and the like are stored.

The operation data Da is operation data appropriately acquired from each of the left controller 3 and/or the right controller 4 and the main body apparatus 2. As described above, operation data acquired from each of the left controller 3 and/or the right controller 4 and the main body apparatus 2 includes information regarding an input (specifically, information regarding an operation or the detection result of each sensor) from each of the input sections (specifically, each button, each analog stick, the touch panel, and each sensor). In the exemplary embodiment, operation data is acquired in a predetermined cycle from each of the left controller 3 and/or the right controller 4 and the main body apparatus 2, and the operation data Da is appropriately updated using the acquired operation data. It should be noted that the update cycle of the operation data Da may be such that the operation data Da is updated every frame, which is the cycle of the processing described later executed by the main body apparatus 2, or is updated every cycle in which the above operation data is acquired.

The reference orientation data Db is data indicating a reference orientation in real space set for the unified apparatus. For example, the reference orientation data Db is data indicating a reference orientation of the unified apparatus based on the direction of gravity in real space (e.g., the direction of each of predetermined three axes of the unified apparatus (e.g., xyz axes orthogonal to each other in the main body apparatus 2, the left controller 3, or the right controller 4) with respect to the direction of gravity).

The amount-of-change data Dc is data indicating the amount of change by which the orientation of the unified apparatus in real space changes with respect to the reference orientation. For example, the amount-of-change data Dc is data indicating, based on the three axes of the unified apparatus in the reference orientation, the current differences (angular differences) between the three axes of the unified apparatus as the amount of change in the orientation of the unified apparatus.

The virtual camera data Dd is data indicating the position and the orientation of the virtual camera in the virtual space and a reference orientation.

The pointer data De is data indicating the position of the pointer M displayed on the display 12.

The player object data Df is data indicating the placement position and the placement orientation of the player object placed in the virtual space and the action, the state, and the like of the player object in the virtual space. The object data Dg is data indicating the type, the placement position, the placement orientation, the placement state, and the like of each of objects placed in the virtual space.

The stick operation flag data Dh is data indicating a stick operation flag that is set to on when the tilt operations are performed on the left stick 32 and/or the right stick 52.

The image data Di is data for displaying an image (e.g., an image of the player object, images of the character object CO and the objects OBJ, an image of the virtual space, a background image, and the like) on the display screen (e.g., the display 12 of the main body apparatus 2).

Figure 13:
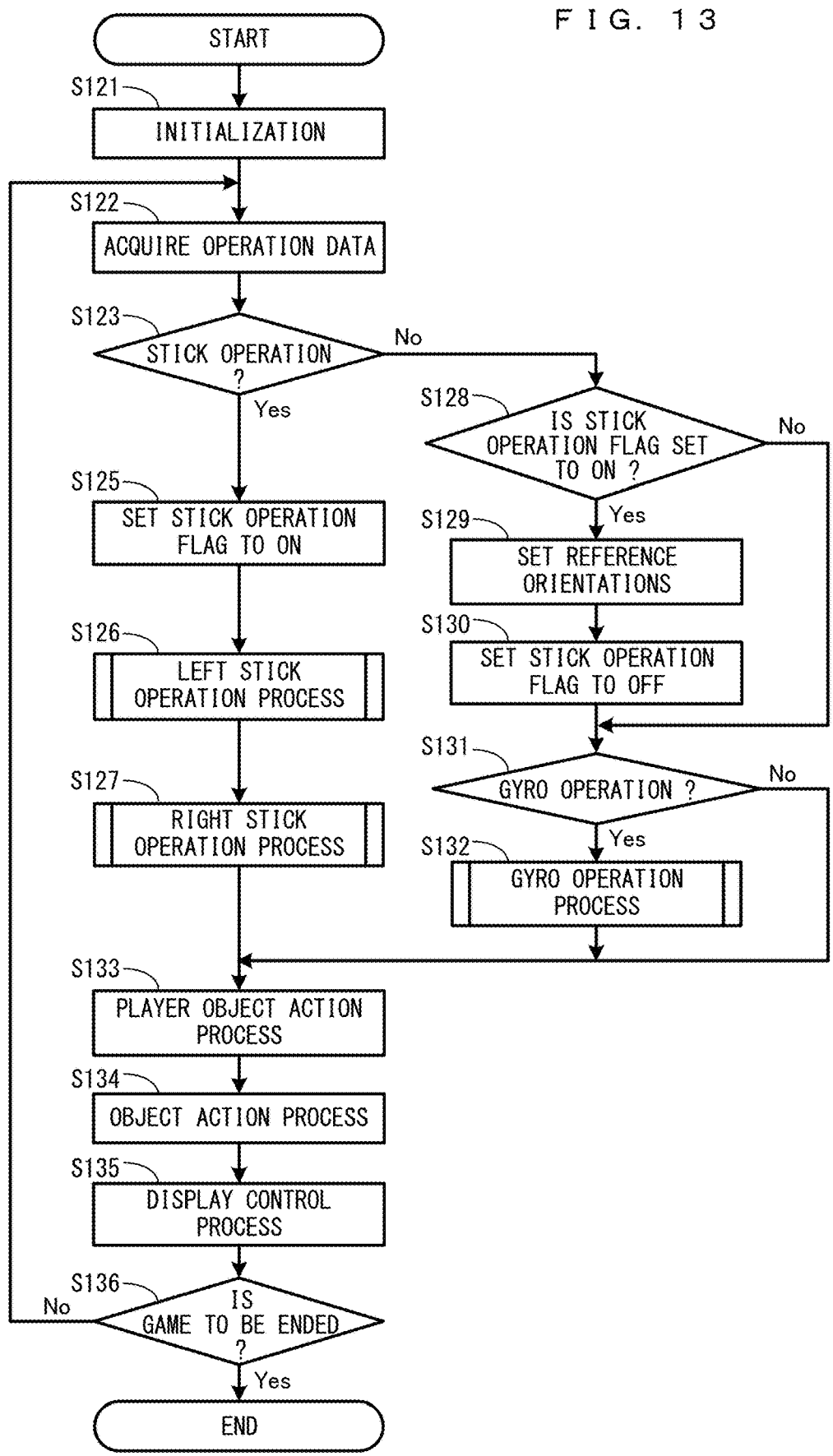
FIG. 13 is a flow chart showing a non-limiting example of information processing executed by a game system 1.
Figure 14:
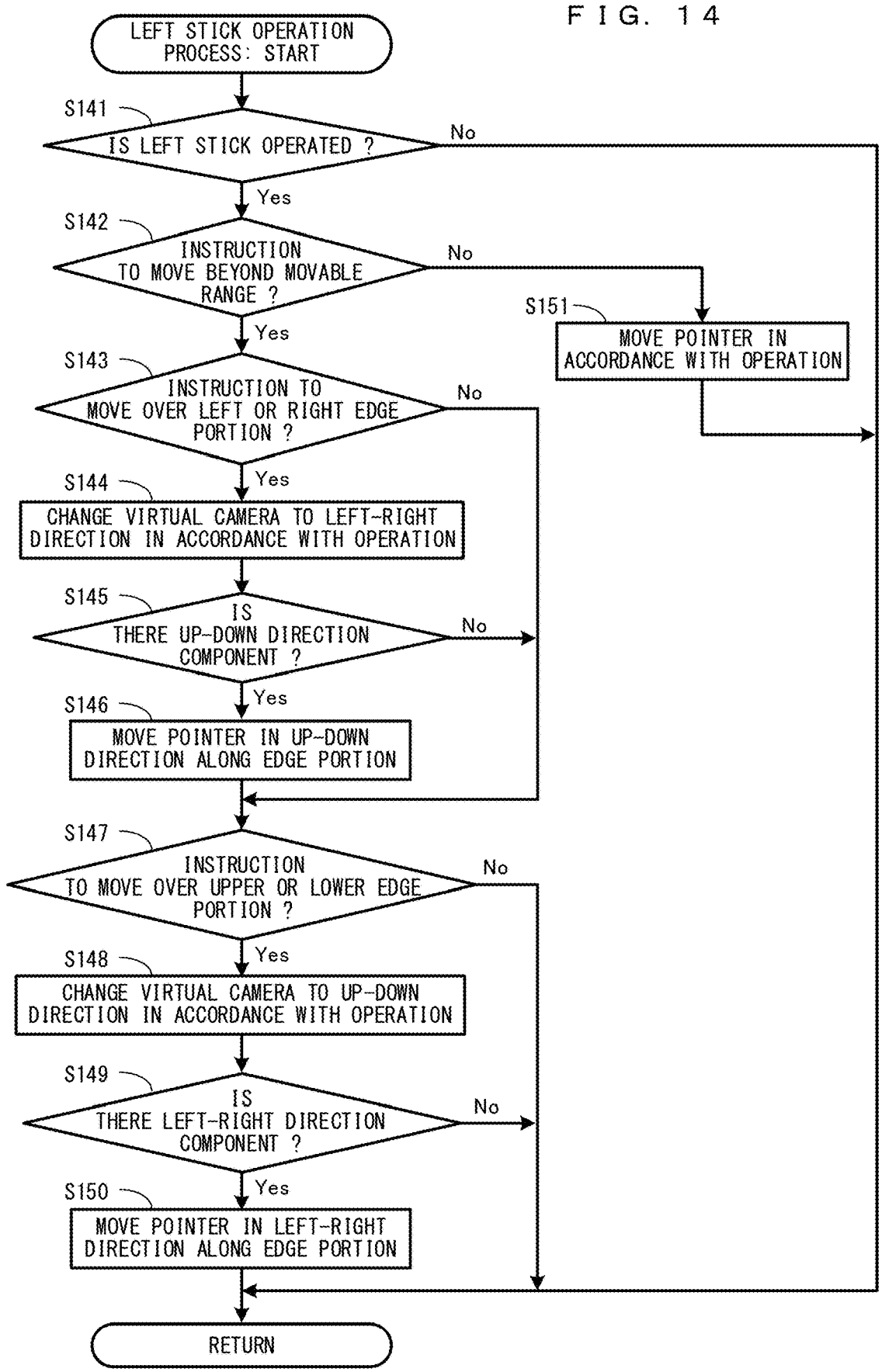
FIG. 14 is a subroutine showing a non-limiting detailed example of a left stick operation process performed in step S126 in FIG. 13.
Figure 15:
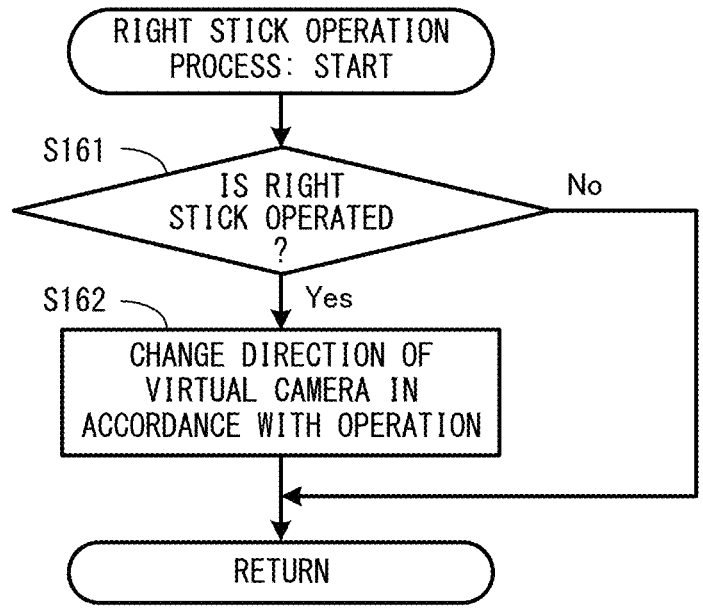
FIG. 15 is a subroutine showing a non-limiting detailed example of a right stick operation process performed in step S127 in FIG. 13.
Figure 16:
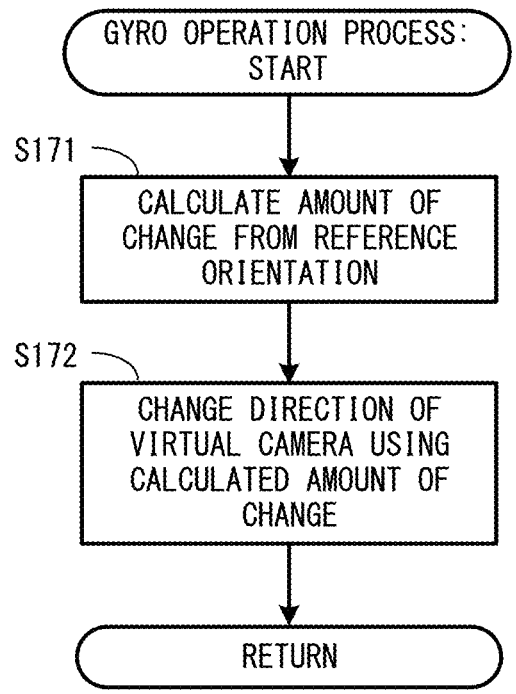
FIG. 16 is a subroutine showing a non-limiting detailed example of a gyro operation process performed in step S132 in FIG. 13.

Next, with reference to FIGS. 13 to 16, a detailed example of information processing according to the exemplary embodiment is described. FIG. 13 is a flow chart showing an example of information processing executed by the game system 1. FIG. 14 is a subroutine showing a detailed example of a left stick operation process performed in step S126 in FIG. 13. FIG. 15 is a subroutine showing a detailed example of a right stick operation process performed in step S127 in FIG. 13. FIG. 16 is a subroutine showing a detailed example of a gyro operation process performed in step S132 in FIG. 13. In the exemplary embodiment, a series of processes shown in FIGS. 13 to 16 is performed by the processor 81 executing a predetermined application program (a game program) included in the various programs Pa. Further, the information processing shown in FIGS. 13 to 16 is started at any timing.

It should be noted that the processes of all of the steps in the flow charts shown in FIGS. 13 to 16 are merely illustrative. Thus, the processing order of the steps may be changed, or another process may be performed in addition to (or instead of) the processes of all of the steps, so long as similar results are obtained. Further, in the exemplary embodiment, descriptions are given on the assumption that the processor 81 performs the processes of all of the steps in the flow charts. Alternatively, a processor or a dedicated circuit other than the processor 81 may perform the processes of some of the steps in the flow charts. Yet alternatively, part of the processing performed by the main body apparatus 2 may be executed by another information processing apparatus capable of communicating with the main body apparatus 2 (e.g., a server capable of communicating with the main body apparatus 2 via a network). That is, all the processes shown in FIGS. 13 to 16 may be executed by the cooperation of a plurality of information processing apparatuses including the main body apparatus 2.

In FIG. 13, the processor 81 performs initialization in information processing (step S121), and the processing proceeds to the next step. For example, in the initialization, the processor 81 initializes parameters for performing the processing described below. For example, based on the settings of the virtual space made in advance, the processor 81 initially places the player object and a plurality of objects in the virtual space, thereby initializing the player object data Df and the object data Dg. The processor 81 sets the virtual camera for generating a first-person image of the player object and updates the virtual camera data Dd using the current orientation of the virtual camera as a reference orientation. The processor 81 sets the current orientation of the unified apparatus in real space as a reference orientation, thereby updating the reference orientation data Db.

Next, the processor 81 acquires operation data from the left controller 3, the right controller 4, and/or the main body apparatus 2 and updates the operation data Da (step S122), and the processing proceeds to the next step.

Next, the processor 81 determines whether or not a stick operation is performed (step S123). For example, with reference to the operation data Da, if a tilt operation is performed on at least one of the left stick 32 and the right stick 52, the determination of the processor 81 is affirmative in the above step S123. If a tilt operation is performed on neither of the left stick 32 and the right stick 52, the determination is negative in the above step S123. Then, if the stick operation is performed, the processing proceeds to step S125. If, on the other hand, the stick operation is not performed, the processing proceeds to step S128.

In step S125, the processor 81 sets the stick operation flag to on, and the processing proceeds to the next step. For example, the processor 81 sets the stick operation flag to on, thereby updating the stick operation flag data Dh.

Next, the processor 81 performs a left stick operation process (step S126), and the processing proceeds to step S127. With reference to FIG. 14, a description is given below of the left stick operation process performed in the above step S126.

In FIG. 14, the processor 81 determines whether or not the left stick is operated (step S141). For example, with reference to the operation data Da, if a tilt operation is performed on the left stick 32, the determination of the processor 81 is affirmative in the above step S141. Then, if the left stick is operated, the processing of the processor 81 proceeds to step S142. If, on the other hand, the left stick is not operated, the processing of the processor 81 in this subroutine ends.

In step S142, the processor 81 determines whether or not the tilt operation on the left stick indicates an instruction to move the display position of the pointer M beyond the movable range A. For example, with reference to the operation data Da and the pointer data De, if the display position of the pointer M is placed in an edge portion of the movable range A, and the tilt operation on the left stick 32 indicates an instruction to move the pointer M from the edge portion to outside the movable range A, the determination of the processor 81 is affirmative in the above step S142. Then, if the tilt operation on the left stick indicates an instruction to move the display position of the pointer M beyond the movable range A, the processing of the processor 81 proceeds to step S143. If, on the other hand, the tilt operation on the left stick does not indicate an instruction to move the display position of the pointer M beyond the movable range A, the processing of the processor 81 proceeds to step S151.

In step S143, the processor 81 determines whether or not the tilt operation on the left stick indicates an instruction to move the display position of the pointer M over a left or right edge portion of the movable range A. For example, with reference to the operation data Da and the pointer data De, if the display position of the pointer M is placed in the left edge portion or the right edge portion of the movable range A, and the tilt operation on the left stick 32 indicates an instruction to move the pointer M from the left edge portion or the right edge portion to outside the movable range A, the determination of the processor 81 is affirmative in the above step S143. Then, if the tilt operation on the left stick indicates an instruction to move the display position of the pointer M over the left or right edge portion of the movable range A, the processing of the processor 81 proceeds to step S144. If, on the other hand, the tilt operation on the left stick does not indicate an instruction to move the display position of the pointer M over the left or right edge portion of the movable range A, the processing of the processor 81 proceeds to step S147.

In step S144, in accordance with the tilt operation on the left stick 32, the processor 81 changes the direction of the virtual camera to the left-right direction, and the processing proceeds to the next step. For example, if an instruction to move the display position of the pointer M over the left edge portion of the movable range A is given, the processor 81 changes the direction in which the virtual camera rotates to the left direction. If an instruction to move the display position of the pointer M over the right edge portion of the movable range A is given, the processor 81 changes the direction to the right direction. Based on the left-right direction component of the tilt angle of the left stick 32, the processor 81 calculates the rotational velocity of the virtual camera (the greater the left-right direction component of the tilt angle is, the faster the rotational velocity is). Then, the processor 81 changes the orientation of the virtual camera indicated by the virtual camera data Dd based on the calculated rotational direction and rotational velocity of the virtual camera and updates the virtual camera data Dd using the orientation of the virtual camera after the change. In the process of the above step S144, in accordance with the tilt operation on the left stick 32, the processor 81 maintains the position of the pointer M as it is without moving the pointer M in the left-right direction.

Next, the processor 81 determines whether or not there is an up-down direction component of the tilt angle of the tilt operation on the left stick 32 (step S145). Then, if there is an up-down direction component of the tilt angle of the tilt operation on the left stick 32, the processing of the processor 81 proceeds to step S146. If, on the other hand, there is not an up-down direction component of the tilt angle of the tilt operation on the left stick 32, the processing of the processor 81 proceeds to step S147.

In step S146, the processor 81 moves the pointer M along the left edge portion or the right edge portion of the movable range A where the pointer M is placed, and the processing proceeds to step S147. For example, if the pointer M is placed in the left edge portion of the movable range A, the processor 81 calculates a moving velocity based on the up-down direction component of the tilt angle of the tilt operation on the left stick 32, moves the pointer M along the left edge portion at the moving velocity in the direction in which the up-down component occurs, and updates the pointer data De using the position after the movement. If the pointer M is placed in the right edge portion of the movable range A, the processor 81 calculates a moving velocity based on the up-down direction component of the tilt angle of the tilt operation on the left stick 32, moves the pointer M along the right edge portion at the moving velocity in the direction in which the up-down component occurs, and updates the pointer data De using the position after the movement. If the movement of the pointer M will lead to a movement over an upper edge portion or a lower edge portion of the movable range A, the processor 81 stops the movement of the pointer M at the position where the pointer M reaches the upper edge portion or the lower edge portion, thereby updating the pointer data De.

In step S147, the processor 81 determines whether or not the tilt operation on the left stick indicates an instruction to move the display position of the pointer M over the upper or lower edge portion of the movable range A. For example, with reference to the operation data Da and the pointer data De, if the display position of the pointer M is placed in the upper edge portion or the lower edge portion of the movable range A, and the tilt operation on the left stick 32 indicates an instruction to move the pointer M from the upper edge portion or the lower edge portion to outside the movable range A, the determination of the processor 81 is affirmative in the above step S147. Then, if the tilt operation on the left stick indicates an instruction to move the display position of the pointer M over the upper or lower edge portion of the movable range A, the processing of the processor 81 proceeds to step S148. If, on the other hand, the tilt operation on the left stick does not indicate an instruction to move the display position of the pointer M over the upper or lower edge portion of the movable range A, the processing of the processor 81 in this subroutine ends.

In step S148, in accordance with the tilt operation on the left stick 32, the processor 81 changes the direction of the virtual camera to the up-down direction, and the processing proceeds to the next step. For example, if an instruction to move the display position of the pointer M over the upper edge portion of the movable range A is given, the processor 81 changes the direction in which the virtual camera rotates to the up direction. If an instruction to move the display position of the pointer M over the lower edge portion of the movable range A is given, the processor 81 changes the direction to the down direction. Based on the up-down direction component of the tilt angle of the left stick 32, the processor 81 calculates the rotational velocity of the virtual camera (the greater the up-down direction component of the tilt angle is, the faster the rotational velocity is). Then, the processor 81 changes the orientation of the virtual camera indicated by the virtual camera data Dd based on the calculated rotational direction and rotational velocity of the virtual camera and updates the virtual camera data Dd using the orientation of the virtual camera after the change. In the process of the above step S148, in accordance with the tilt operation on the left stick 32, the processor 81 maintains the position of the pointer M as it is without moving the pointer M in the up-down direction.

Next, the processor 81 determines whether or not there is a left-right direction component of the tilt angle of the tilt operation on the left stick 32 (step S149). Then, if there is a left-right direction component of the tilt angle of the tilt operation on the left stick 32, the processing of the processor 81 proceeds to step S150. If, on the other hand, there is not a left-right direction component of the tilt angle of the tilt operation on the left stick 32, the processing of the processor 81 in this subroutine ends.

In step S150, the processor 81 moves the pointer M along the upper edge portion or the lower edge portion of the movable range A where the pointer M is placed, and the processing of this subroutine ends. For example, if the pointer M is placed in the upper edge portion of the movable range A, the processor 81 calculates a moving velocity based on the left-right direction component of the tilt angle of the tilt operation on the left stick 32, moves the pointer M along the upper edge portion at the moving velocity in the direction in which the left-right component occurs, and updates the pointer data De using the position after the movement. If the pointer M is placed in the lower edge portion of the movable range A, the processor 81 calculates a moving velocity based on the left-right direction component of the tilt angle of the tilt operation on the left stick 32, moves the pointer M along the lower edge portion at the moving velocity in the direction in which the left-right component occurs, and updates the pointer data De using the position after the movement. If the movement of the pointer M will lead to a movement over the left edge portion or the right edge portion of the movable range A, the processor 81 stops the movement of the pointer M at the position where the pointer M reaches the left edge portion or the right edge portion, thereby updating the pointer data De.

If, on the other hand, it is determined in the process of the above step S142 that the tilt operation on the left stick does not indicate an instruction to move the display position of the pointer M beyond the movable range A, the processor 81 moves the pointer M in accordance with the tilt operation on the left stick (step S151), and the processing of this subroutine ends. For example, the processor 81 calculates a moving velocity based on the tilt angle of the tilt operation on the left stick 32, moves the pointer M at the moving velocity in the direction in which the tilt operation is performed, and updates the pointer data De using the position after the movement. If the movement of the pointer M will lead to a movement over an edge portion of the movable range A, the processor 81 stops the movement of the pointer M at the position where the pointer M reaches the edge portion, thereby updating the pointer data De.

Referring back to FIG. 13, after the left stick operation process in the above step S126, the processor 81 performs a right stick operation process (step S127), and the processing proceeds to step S133. With reference to FIG. 15, a description is given below of the right stick operation process performed in the above step S127.

In FIG. 15, the processor 81 determines whether or not the right stick is operated (step S161). For example, with reference to the operation data Da, if a tilt operation is performed on the right stick 52, the determination of the processor 81 is affirmative in the above step S161. Then, if the right stick is operated, the processing of the processor 81 proceeds to step S162. If, on the other hand, the right stick is not operated, the processing of the processor 81 in this subroutine ends.

In step S162, in accordance with the right stick operation, the processor 81 changes the direction of the virtual camera, and the processing of this subroutine ends. For example, based on the operation data Da, the processor 81 sets the direction in which the virtual camera rotates to the same direction as the tilt direction of the right stick 52. Based on the tilt angle of the right stick 52, the processor 81 calculates the rotational velocity of the virtual camera (the larger the tilt angle is, the faster the rotational velocity is). Then, the processor 81 changes the orientation of the virtual camera indicated by the virtual camera data Dd based on the calculated rotational direction and rotational velocity of the virtual camera and updates the virtual camera data Dd using the orientation of the virtual camera after the change. If the direction of the virtual camera is changed by the tilt operation on the left stick 32 in the above step S144 and/or the above step S148, in the process of the above step S162, the direction of the virtual camera is further changed in addition to this change in the direction of the virtual camera (i.e., by adding the quantities of change). In the process of the above step S162, the processor 81 maintains the position of the pointer M as it is without moving the pointer M in accordance with the tilt operation on the right stick 52.

In FIG. 13, if it is determined in the above step S123 that a stick operation is not performed, the processor 81 determines whether or not the stick operation flag is set to on (step S128). For example, with reference to the stick operation flag data Dh, the processor 81 determines whether or not the stick operation flag is set to on. Then, if the stick operation flag is set to on, the processing of the processor 81 proceeds to step S129. If, on the other hand, the stick operation flag is set to off, the processing of the processor 81 proceeds to step S131.

In step S129, the processor 81 sets the reference orientations of the unified apparatus and the virtual camera, and the processing proceeds to the next step. For example, the processor 81 sets the current orientation of the unified apparatus in real space as the reference orientation of the unified apparatus, thereby updating the reference orientation data Db. The processor 81 sets the current orientation of the virtual camera in the virtual space as the reference orientation of the virtual camera, thereby updating the virtual camera data Dd. As described above, in the above step S129, at the time when the tilt operations on the sticks (the tilt operations on the left stick 32 and/or the right stick 52) end, the reference orientations of the unified apparatus and the virtual camera are reset, and the orientations of the unified apparatus and the virtual camera at this time are set as new reference orientations.

Next, the processor 81 sets the stick operation flag to off (step S130), and the processing of the processor 81 proceeds to step S131. For example, the processor 81 sets the stick operation flag to off, thereby updating the stick operation flag data Dh.

In step S131, the processor 81 determines whether or not a gyro operation by changing the orientation of the unified apparatus is performed (step S131). For example, with reference to the operation data Da, if the orientation of the unified apparatus changes (e.g., an angular velocity is generated in the unified apparatus) as compared with the previous processing, the determination of the processor 81 is affirmative in the above step S131. Then, if a gyro operation is performed, the processing of the processor 81 proceeds to step S132. If, on the other hand, a gyro operation is not performed, the processing of the processor 81 proceeds to step S133.

In step S132, the processor 81 performs a gyro operation process, and the processing proceeds to step S133. With reference to FIG. 16, a description is given below of the gyro operation process performed in the above step S132.

In FIG. 16, the processor 81 calculates the amount of change in the orientation of the unified apparatus from the reference orientation of the unified apparatus (step S171), and the processing proceeds to the next step. For example, with reference to the angular velocity indicated by the operation data Da and the reference orientation indicated by the reference orientation data Db, the processor 81 calculates the amount of change in the orientation of the unified apparatus from the reference orientation of the unified apparatus in each of the three axes (the xyz axes) of the unified apparatus (e.g., the angular difference between each of the three axes and the reference orientation) and updates the amount-of-change data Dc using the calculated amount of change in the orientation.

Next, the processor 81 changes the direction of the virtual camera using the amount of change in the orientation calculated in the above step S171 (step S172), and the processing of this subroutine ends. For example, the processor 81 calculates the orientation of the virtual camera by changing the direction of the virtual camera from the reference orientation of the virtual camera indicated by the virtual camera data Dd using the amount of change in the orientation indicated by the amount-of-change data Dc.

Then, the processor 81 updates the virtual camera data Dd using the calculated orientation as the current orientation of the virtual camera. Specifically, in accordance with the direction of change in the orientation of the unified apparatus with respect to the reference orientation of the unified apparatus indicated by the amount-of-change data Dc, the processor 81 changes the orientation of the virtual camera in the virtual space from the reference orientation of the virtual camera to the same direction as the change in the orientation of the unified apparatus. Then, the processor 81 changes the orientation of the virtual camera in the virtual space from the reference orientation of the virtual camera by the same amount as the amount of change in the orientation of the unified apparatus with respect to the reference orientation of the unified apparatus indicated by the amount-of-change data Dc. The orientation of the virtual camera is thus changed, whereby the orientation of the virtual camera changes from the reference orientation similarly to the change in the orientation of the unified apparatus from the reference orientation set for the unified apparatus (the amount of angular change from the reference orientation with respect to each of the yaw, pitch, and roll directions).

Referring back to FIG. 13, in step S133, the processor 81 causes the player object to perform an action in the virtual space, and the processing proceeds to the next step. For example, based on the operation data Da acquired in step S122, the processor 81 causes the player object to perform an action, thereby updating the player object data Df. In accordance with the action of the player object and the state of the surroundings, and based on virtual physical calculations on the player object and the virtual space, the processor 81 causes the player object placed in the virtual space to perform an action, thereby updating the player object data Df. Further, based on a state change calculation for changing the state of the player object, the processor 81 changes the state of the player object, thereby updating the player object data Df.

Next, the processor 81 causes each object to perform an action in the virtual space (step S134), and the processing proceeds to the next step. For example, based on virtual physical calculations on the action of the player object, the actions of an object itself such as the character object and other objects, and the virtual space, the processor 81 causes each object placed in the virtual space to perform an action, thereby updating the object data Dg. Based on a state change calculation for changing the state of each object, the processor 81 changes the state of each object, thereby updating the object data Dg.

Next, the processor 81 performs a display control process (step S135), and the processing proceeds to the next step. For example, based on the pointer data De, the player object data Df, and the object data Dg, the processor 81 places the player object, each object, and the pointer M in the virtual space. Based on the player object data Df and the virtual camera data Dd, the processor 81 sets the position and/or the orientation of the virtual camera for generating a display image and places the virtual camera in the virtual space. Then, the processor 81 generates an image of the virtual space viewed from the set virtual camera and performs control for displaying the virtual space image on the display 12.

Next, the processor 81 determines whether or not the game processing is to be ended (step S136). Examples of a condition for ending the game processing in the above step S136 include the fact that the condition for ending the game processing is satisfied, the fact that the user performs the operation for ending the game processing, and the like. If the game processing is not to be ended, the processing returns to the above step S122, and the process of step S122 is repeated. If the game processing is to be ended, the processing of the flow chart ends. Hereinafter, the series of processes of steps S122 to S136 is repeatedly executed until it is determined in step S133 that the processing is to be ended.

As described above, in the exemplary embodiment, in a case where the position or the image capturing direction of a virtual camera can be changed by a plurality of user operations including at least a stick operation and the operation of changing the orientation of the entirety of an apparatus, it is possible to improve operability when processes based on the plurality of user operations are simultaneously performed.

In the above exemplary embodiment, in a case where there are a plurality of input units for changing the position or the image capturing direction of a virtual camera, based on whether or not a process based on an operation using one of the input units is performed, the quantity of change in the position or the image capturing direction of the virtual camera is adjusted based on an operation using another one of the input units. Thus, it is possible to improve the operability of an input unit.

Further, the game system 1 may be any apparatus, and may be a mobile game apparatus, any mobile electronic device (a PDA (Personal Digital Assistant), a mobile phone, a personal computer, a camera, a tablet, or the like. In this case, an input device for performing the operation of moving an object may not be the left controller 3 or the right controller 4, and may be another controller, a mouse, a touch pad, a touch panel, a trackball, a keyboard, a directional pad, a slide pad, or the like.

Further, the above descriptions have been given using an example where the game system 1 performs information processing and a communication process. Alternatively, another apparatus may perform at least some of the processing steps. For example, if the game system 1 is further configured to communicate with another apparatus (e.g., another server, another image display device, another game apparatus, or another mobile terminal), the other apparatus may cooperate to perform the processing steps. Another apparatus may thus perform at least some of the processing steps, thereby enabling processing similar to that described above. Further, the above information processing can be performed by a processor or the cooperation of a plurality of processors, the processor or the plurality of processors included in an information processing system including at least one information processing apparatus. Further, in the above exemplary embodiment, information processing can be performed by the processor 81 of the game system 1 executing a predetermined program. Alternatively, part or all of the processing of the flow charts may be performed by a dedicated circuit included in the game system 1.

Here, according to the above variations, it is possible to achieve the exemplary embodiment also by a system form such as cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the above processing. Thus, it goes without saying that it is possible to achieve the exemplary embodiment by sharing the processing in any manner.

Further, the processing orders, the setting values, the conditions used in the determinations, and the like that are used in the information above processing are merely illustrative. Thus, it goes without saying that the exemplary embodiment can be achieved also with other orders, other values, and other conditions.

Further, the above program may be supplied to the game system 1 not only through an external storage medium such as an external memory, but also through a wired or wireless communication link. Further, the program may be stored in advance in a non-volatile storage device included in the apparatus. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. When used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment can be used as an information processing program, an information processing apparatus, an information processing system, an information processing method, and the like that are capable of improving the operability of an input unit for changing the position or the image capturing direction of a virtual camera.

What is claimed is:

1. A non-transitory computer-readable storage medium having stored therein instructions that, when executed by a processor of an information processing apparatus, cause the information processing apparatus to perform operations comprising:

capturing a virtual space using a virtual camera to generate a display image to be displayed on a screen;

based on a pointer operation through a first input unit, performing a pointer operation process for changing a position of a pointer displayed on the screen;

based on a first camera operation through a second input unit, performing a camera operation process for changing a position or an image capturing direction of the virtual camera;

based on a second camera operation through a third input unit using an inertial sensor, performing a camera operation process for changing the position or the image capturing direction of the virtual camera; and in a case where the second camera operation is performed while the pointer operation process based on the pointer operation or the camera operation process based on the first camera operation is performed, reducing an absolute value of a quantity of change in the position or the image capturing direction of the virtual camera based on the second camera operation as compared with a case where the second camera operation is performed when neither of the pointer operation process based on the pointer operation and the camera operation process based on the first camera operation are performed.

2. The non-transitory computer-readable storage medium according to claim 1, wherein the instructions, when executed, further cause the information processing apparatus to perform operations comprising:

setting in the screen a movable range indicating a range where the pointer can move; and in a case where the pointer is located in an edge portion of the movable range, and if an edge portion operation as an operation of indicating a direction from the edge portion of the movable range to outside the movable range through the first input unit is performed, changing the position or the image capturing direction of the virtual camera in accordance with the direction of the edge portion operation.

3. The non-transitory computer-readable storage medium according to claim 2, wherein in a case where the second camera operation is performed while an edge portion operation process based on the edge portion operation or the camera operation process based on the first camera operation is performed, the absolute value of the quantity of change in the position or the image capturing direction of the virtual camera based on the second camera operation is reduced as compared with a case where the second camera operation is performed when neither of the edge portion operation process based on the edge portion operation and the camera operation process based on the first camera operation are performed.

4. The non-transitory computer-readable storage medium according to claim 2, wherein if the edge portion operation is performed, the pointer located in the edge portion of the movable range and displayed on the screen is not moved.

5. The non-transitory computer-readable storage medium according to claim 2, wherein:

if the edge portion operation is performed by a first quantity of operation without performing the first camera operation, the position or the image capturing direction of the virtual camera is changed by the first quantity of change in a first axis component, if the first camera operation is performed by a second quantity of operation without performing the edge portion operation, the position or the image capturing direction of the virtual camera is changed by the second quantity of change in the first axis component, and in a case where the edge portion operation by the first quantity of operation and the first camera operation by the second quantity of operation are simultaneously performed, and if the first axis component of the first quantity of change and the first axis component of the second quantity of change are both positive, the quantity of change in the position or the image capturing direction of the virtual camera is set to a third quantity of change greater than both the first quantity of change and the second quantity of change in the first axis component, and if the first axis component of the first quantity of change and the first axis component of the second quantity of change are both negative, the quantity of change in the position or the image capturing direction of the virtual camera is set to a third quantity of change smaller than both the first quantity of change and the second quantity of change in the first axis component.

6. The non-transitory computer-readable storage medium according to claim 5, wherein the third quantity of change is determined by adding the first quantity of change and the second quantity of change.

7. The non-transitory computer-readable storage medium according to claim 1, wherein the quantity of change in the position or the image capturing direction of the virtual camera based on the first camera operation is the same in a case where the first camera operation is performed while the pointer operation process based on the pointer operation is performed and in a case where the first camera operation is performed while the pointer operation process based on the pointer operation is not performed.

8. The non-transitory computer-readable storage medium according to claim 2, wherein the quantity of change in the position or the image capturing direction of the virtual camera based on the first camera operation is the same in a case where the first camera operation is performed while an edge portion operation process based on the edge portion operation is performed and in a case where the first camera operation is performed while the edge portion operation process based on the edge portion operation is not performed.

9. The non-transitory computer-readable storage medium according to claim 1, wherein in a case where the second camera operation is performed while the pointer operation process based on the pointer operation or the camera operation process based on the first camera operation is performed, the position or the image capturing direction of the virtual camera based on the second camera operation is not changed.

10. The non-transitory computer-readable storage medium according to claim 1, wherein:
using an orientation change operation for changing an orientation from a reference orientation through the third input unit as the second camera operation, based on an amount of change in the orientation calculated based on an output of the inertial sensor, the quantity of change in the position or the image capturing direction of the virtual camera is determined, and
while the pointer operation process based on the pointer operation or the camera operation process based on the first camera operation is performed, the determination of the quantity of change based on the change in the orientation is skipped, and an orientation of the third input unit at a time when the pointer operation or the first camera operation ends is newly set as the reference orientation.

11. The non-transitory computer-readable storage medium according to claim 1, wherein the instructions, when executed, further cause the information processing apparatus to perform operations comprising performing game processing based on a position or a direction in the virtual space determined based on the position of the pointer displayed on the screen.

12. The non-transitory computer-readable storage medium according to claim 11, wherein a virtual object is fired at the position or in the direction in the virtual space determined based on the position of the pointer, in the game processing.

13. The non-transitory computer-readable storage medium according to claim 1, wherein each of the first input unit and the second input unit is a device that provides an output based on an operation using a finger of a user.

14. An information processing apparatus, comprising:
a processor and a memory coupled thereto, the processor being configured to control the information processing system to at least:
capture a virtual space using a virtual camera to generate a display image to be displayed on a screen;
based on a pointer operation through a first input unit, perform a pointer operation process for changing a position of a pointer displayed on the screen;
based on a first camera operation through a second input unit, perform a camera operation process for changing a position or an image capturing direction of the virtual camera;
based on a second camera operation through a third input unit using an inertial sensor, perform a camera operation process for changing the position or the image capturing direction of the virtual camera; and
in a case where the second camera operation is performed while the pointer operation process based on the pointer operation or the camera operation process based on the first camera operation is performed, reduce an absolute value of a quantity of change in the position or the image capturing direction of the virtual camera based on the second camera operation as compared with a case where the second camera operation is performed when neither of the pointer operation process based on the pointer operation and the camera operation process based on the first camera operation are performed.

15. An information processing system, comprising:
a processor and a memory coupled thereto, the processor being configured to control the information processing system to at least:
capture a virtual space using a virtual camera to generate a display image to be displayed on a screen;
based on a pointer operation through a first input unit, perform a pointer operation process for changing a position of a pointer displayed on the screen;
based on a first camera operation through a second input unit, perform a camera operation process for changing a position or an image capturing direction of the virtual camera;
based on a second camera operation through a third input unit using an inertial sensor, perform a camera operation process for changing the position or the image capturing direction of the virtual camera; and
in a case where the second camera operation is performed while the pointer operation process based on the pointer operation or the camera operation process based on the first camera operation is performed, reduce an absolute value of a quantity of change in the position or the image capturing direction of the virtual camera based on the second camera operation as compared with a case where the second camera operation is performed when neither of the pointer operation process based on the pointer operation and the camera operation process based on the first camera operation are performed.

16. An information processing method comprising:
capturing a virtual space using a virtual camera to generate a display image to be displayed on a screen;
based on a pointer operation through a first input unit, performing a pointer operation process for changing a position of a pointer displayed on the screen;
based on a first camera operation through a second input unit, performing a camera operation process for changing a position or an image capturing direction of the virtual camera;
based on a second camera operation through a third input unit using an inertial sensor, performing a camera operation process for changing the position or the image capturing direction of the virtual camera; and
in a case where the second camera operation is performed while the pointer operation process based on the pointer operation or the camera operation process based on the first camera operation is performed, reducing an absolute value of a quantity of change in the position or the image capturing direction of the virtual camera based on the second camera operation as compared with a case where the second camera operation is performed when neither of the pointer operation process based on the pointer operation and the camera operation process based on the first camera operation are performed.

17. The information processing method according to claim 16, further comprising:
setting in the screen a movable range indicating a range where the pointer can move; and
in a case where the pointer is located in an edge portion of the movable range, and if an edge portion operation as an operation of indicating a direction from the edge portion of the movable range to outside the movable range through the first input unit is performed, changing the position or the image capturing direction of the virtual camera in accordance with the direction of the edge portion operation.

18. The information processing method according to claim 16, wherein the quantity of change in the position or the image capturing direction of the virtual camera based on the first camera operation is the same in a case where the first camera operation is performed while the pointer operation process based on the pointer operation is performed and in a case where the first camera operation is performed while the pointer operation process based on the pointer operation is not performed.

19. The information processing method according to claim 16, wherein in a case where the second camera operation is performed while the pointer operation process based on the pointer operation or the camera operation process based on the first camera operation is performed, the position or the image capturing direction of the virtual camera based on the second camera operation is not changed.

20. The information processing method according to claim 16, wherein:
using an orientation change operation for changing an orientation from a reference orientation through the third input unit as the second camera operation, based on an amount of change in the orientation calculated based on an output of the inertial sensor, the quantity of change in the position or the image capturing direction of the virtual camera is determined, and
while the pointer operation process based on the pointer operation or the camera operation process based on the first camera operation is performed, the determination of the quantity of change based on the change in the orientation is skipped, and an orientation of the third input unit at a time when the pointer operation or the first camera operation ends is newly set as the reference orientation.

* * * * *